(12) United States Patent
Xue et al.

(10) Patent No.: US 11,985,632 B2
(45) Date of Patent: May 14, 2024

(54) RESOURCE ALLOCATION MODE INDICATION FOR RESOURCE POOL SHARING

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/450,000

(22) Filed: Oct. 5, 2021

(65) Prior Publication Data

US 2023/0109093 A1  Apr. 6, 2023

(51) Int. Cl.
*H04W 72/02* (2009.01)
*H04W 72/20* (2023.01)
*H04W 72/56* (2023.01)

(52) U.S. Cl.
CPC .......... *H04W 72/02* (2013.01); *H04W 72/20* (2023.01); *H04W 72/56* (2023.01)

(58) Field of Classification Search
CPC .............................. H04W 72/56; H04W 72/20
See application file for complete search history.

(56) References Cited

U.S. PATENT DOCUMENTS

| | | | |
|---|---|---|---|
| 2017/0006653 A1* | 1/2017 | Zeng | H04W 72/23 |
| 2020/0229198 A1* | 7/2020 | Kung | H04W 72/54 |
| 2021/0105104 A1* | 4/2021 | Cao | H04L 1/1861 |
| 2021/0105787 A1* | 4/2021 | Park | H04L 43/16 |
| 2021/0219320 A1* | 7/2021 | Belleschi | H04W 76/14 |
| 2022/0159625 A1* | 5/2022 | Park | H04W 4/40 |
| 2022/0312438 A1* | 9/2022 | Yi | H04W 72/1263 |
| 2022/0360403 A1* | 11/2022 | Salim | H04L 5/0078 |
| 2022/0361183 A1* | 11/2022 | Behravan | H04W 72/56 |
| 2023/0131882 A1* | 4/2023 | Lin | H04W 72/566 370/329 |
| 2023/0171795 A1* | 6/2023 | Di Girolamo | H04W 72/51 370/329 |

* cited by examiner

*Primary Examiner* — Won Tae C Kim
(74) *Attorney, Agent, or Firm* — Harrity & Harrity, LLP

(57) ABSTRACT

Various aspects of the present disclosure generally relate to wireless communication. In some aspects, a transmitter user equipment (UE) may identify a sidelink resource allocation mode that indicates a manner in which one or more sidelink resources are allocated for use by the transmitter UE. The UE may transmit, to a receiver UE, sidelink control information (SCI) that includes an indication that is based at least on part on the sidelink resource allocation mode. Numerous other aspects are described.

30 Claims, 16 Drawing Sheets

RESOURCE ALLOCATION MODE INDICATION FOR RESOURCE POOL SHARING

FIELD OF THE DISCLOSURE

Aspects of the present disclosure generally relate to wireless communication and to techniques and apparatuses for resource allocation mode indication for resource pool sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter user equipment (UE). The method may include identifying a sidelink resource allocation mode that indicates a manner in which one or more sidelink resources are allocated for use by the transmitter UE. The method may include transmitting, to a receiver UE, sidelink control information (SCI) that includes an indication that is based at least on part on the sidelink resource allocation mode.

Some aspects described herein relate to a method of wireless communication performed by a receiver UE. The method may include receiving, from a transmitter UE, SCI that includes an indication of a sidelink resource allocation mode that indicates a manner in which one or more sidelink resources are allocated for use by the transmitter UE. The method may include communicating based at least in part on the indication.

Some aspects described herein relate to a method of wireless communication performed by a base station. The method may include transmitting, to a UE, configuration information that is associated with an indication of a sidelink resource allocation mode that indicates a manner in which one or more sidelink resources are allocated for use by the UE. The method may include communicating with one or more UEs based at least in part on the indication.

Some aspects described herein relate to an apparatus for wireless communication performed by a transmitter UE. The apparatus may include a memory and one or more processors, coupled to the memory. The one or more processors may be configured to identify a sidelink resource allocation mode that indicates a manner in which one or more sidelink resources are allocated for use by the transmitter UE. The one or more processors may be configured to transmit, to a receiver UE, SCI that includes an indication that is based at least on part on the sidelink resource allocation mode.

Some aspects described herein relate to an apparatus for wireless communication performed by a receiver UE. The apparatus may include a memory and one or more processors, coupled to the memory. The one or more processors may be configured to receive, from a transmitter UE, SCI that includes an indication of a sidelink resource allocation mode that indicates a manner in which one or more sidelink resources are allocated for use by the transmitter UE. The one or more processors may be configured to communicate based at least in part on the indication.

Some aspects described herein relate to an apparatus for wireless communication performed by a base station. The apparatus may include a memory and one or more processors, coupled to the memory. The one or more processors may be configured to transmit, to a UE, configuration information that is associated with an indication of a sidelink resource allocation mode that indicates a manner in which one or more sidelink resources are allocated for use by the UE. The one or more processors may be configured to communicate with one or more UEs based at least in part on the indication.

Some aspects described herein relate to a non-transitory computer-readable medium that stores a set of instructions for wireless communication by a transmitter UE. The set of instructions, when executed by one or more processors of the UE, may cause the UE to identify a sidelink resource allocation mode that indicates a manner in which one or more sidelink resources are allocated for use by the transmitter UE. The set of instructions, when executed by one or more processors of the UE, may cause the UE to transmit, to a receiver UE, SCI that includes an indication that is based at least on part on the sidelink resource allocation mode.

Some aspects described herein relate to a non-transitory computer-readable medium that stores a set of instructions for wireless communication by a receiver UE. The set of instructions, when executed by one or more processors of the UE, may cause the UE to receive, from a transmitter UE, SCI that includes an indication of a sidelink resource allocation mode that indicates a manner in which one or more sidelink resources are allocated for use by the transmitter UE. The set of instructions, when executed by one or more processors of the UE, may cause the UE to communicate based at least in part on the indication.

Some aspects described herein relate to a non-transitory computer-readable medium that stores a set of instructions for wireless communication by a base station. The set of instructions, when executed by one or more processors of the base station, may cause the base station to transmit, to a UE, configuration information that is associated with an indication of a sidelink resource allocation mode that indicates a manner in which one or more sidelink resources are allocated for use by the UE. The set of instructions, when executed by one or more processors of the base station, may cause the base station to communicate with one or more UEs based at least in part on the indication.

Some aspects described herein relate to an apparatus for wireless communication. The apparatus may include means for identifying a sidelink resource allocation mode that indicates a manner in which one or more sidelink resources are allocated for use by a transmitter UE. The apparatus may include means for transmitting, to a receiver UE, SCI that includes an indication that is based at least on part on the sidelink resource allocation mode.

Some aspects described herein relate to an apparatus for wireless communication. The apparatus may include means for receiving, from a transmitter UE, SCI that includes an indication of a sidelink resource allocation mode that indicates a manner in which one or more sidelink resources are allocated for use by the transmitter UE. The apparatus may include means for communicating based at least in part on the indication.

Some aspects described herein relate to an apparatus for wireless communication. The apparatus may include means for transmitting, to a UE, configuration information that is associated with an indication of a sidelink resource allocation mode that indicates a manner in which one or more sidelink resources are allocated for use by the UE. The apparatus may include means for communicating with one or more UEs based at least in part on the indication.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
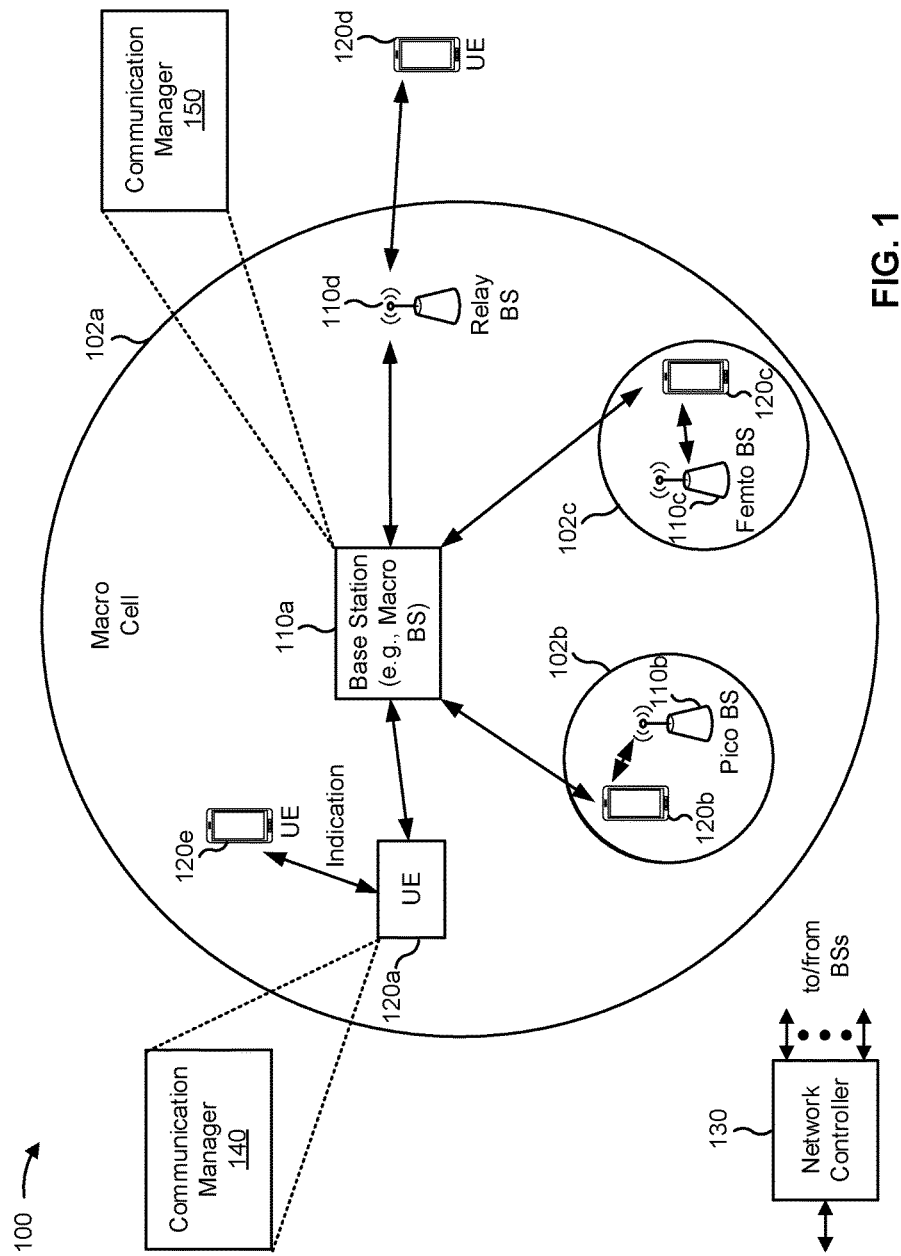
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

In some examples, the UE 120a may transmit, to the UE 120e, an indication of a resource allocation mode associated with one or more resources (e.g., one or more resources made available by the base station 110a). For example, the indication may indicate that the one or more resources are allocated using a first resource allocation mode (e.g., Mode 1) in which the resources are scheduled by the base station 110a. Additionally, or alternatively, the indication may indicate that the one or more resources are allocated using a second resource allocation mode (e.g., Mode 2) in which resources are scheduled among the UEs based at least in part on channel sensing (e.g., without the need for the base station 110a to allocate the resources).

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the transmitter UE 120 may include a communication manager 140. As described in more detail elsewhere herein, the communication manager 140 may identify a sidelink resource allocation mode that indicates a manner in which one or more sidelink resources are allocated for use by the transmitter UE; and transmit, to a receiver UE, sidelink control information (SCI) that includes an indication that is based at least on part on the sidelink resource allocation mode. Additionally, or alternatively, the communication manager 140 may perform one or more other operations described herein.

In some aspects, the receiver UE 120 may include a communication manager 140. As described in more detail elsewhere herein, the communication manager 140 may receive, from a transmitter UE, SCI that includes an indication of a sidelink resource allocation mode that indicates a manner in which one or more sidelink resources are allocated for use by the transmitter UE; and communicate based at least in part on the indication. Additionally, or alternatively, the communication manager 140 may perform one or more other operations described herein.

In some aspects, the base station 110 may include a communication manager 150. As described in more detail elsewhere herein, the communication manager 150 may transmit, to a UE, configuration information that is associated with an indication of a sidelink resource allocation mode that indicates a manner in which one or more sidelink resources are allocated for use by the UE; and communicate with one or more UEs based at least in part on the indication. Additionally, or alternatively, the communication manager 150 may perform one or more other operations described herein.

As indicated above, FIG. 1 is provided as an example. Other examples may differ from what is described with regard to FIG. 1.

Figure 2:
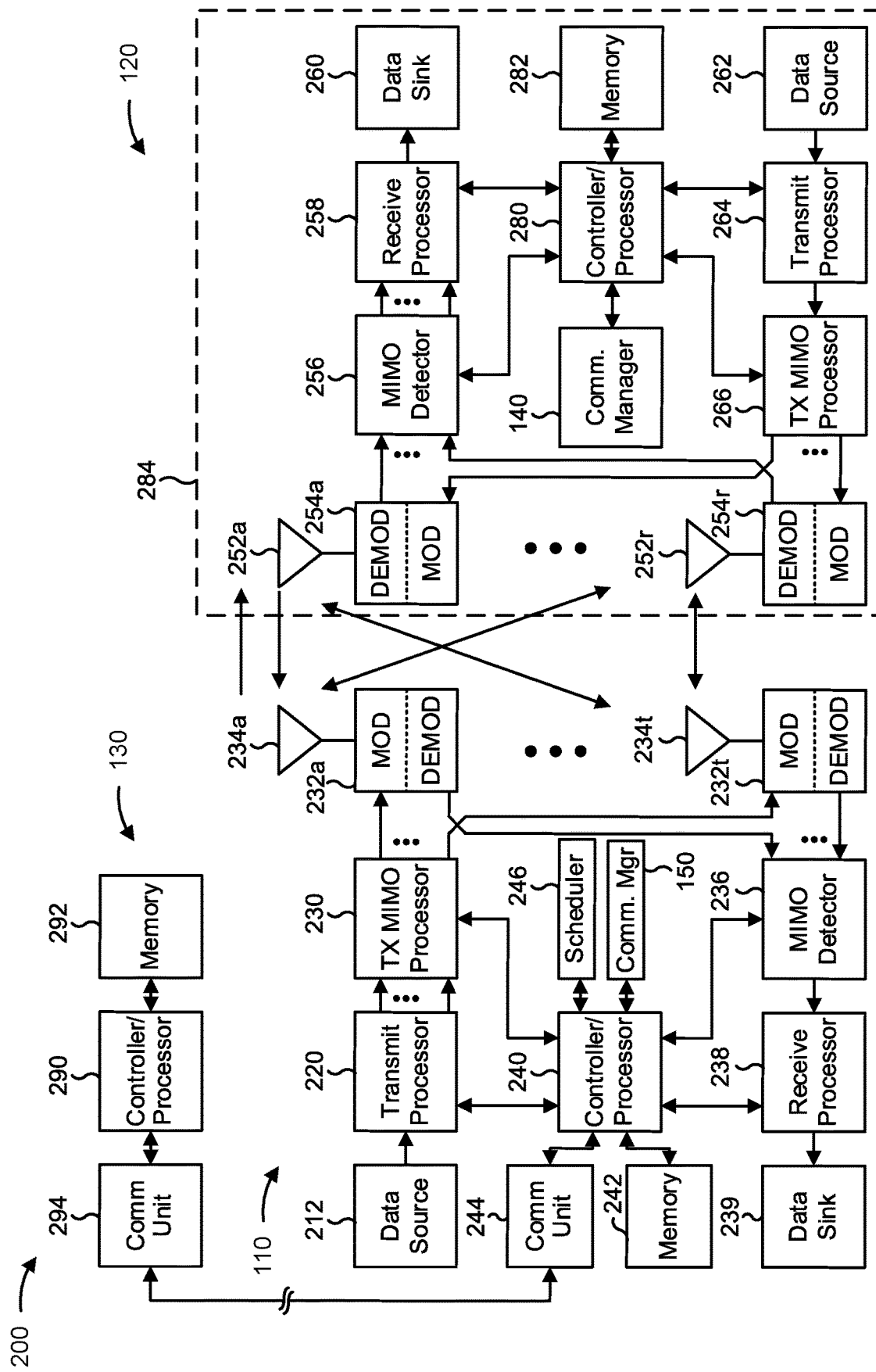
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with resource allocation mode indication for resource pool sharing, as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the transmitter UE 120 includes means for identifying a sidelink resource allocation mode that indicates a manner in which one or more sidelink resources are allocated for use by the transmitter UE 120; and/or means for transmitting, to a receiver UE 120, SCI that includes an indication that is based at least on part on the sidelink resource allocation mode. The means for the transmitter UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the receiver UE 120 includes means for receiving, from a transmitter UE 120, SCI that includes an indication of a sidelink resource allocation mode that indicates a manner in which one or more sidelink resources are allocated for use by the transmitter UE 120; and/or means for communicating based at least in part on the indication. The means for the receiver UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE 120, configuration information that is associated with an indication of a sidelink resource allocation mode that indicates a manner in which one or more sidelink resources are allocated for use by the UE 120; and/or means for communicating with one or more UEs based at least in part on the indication. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
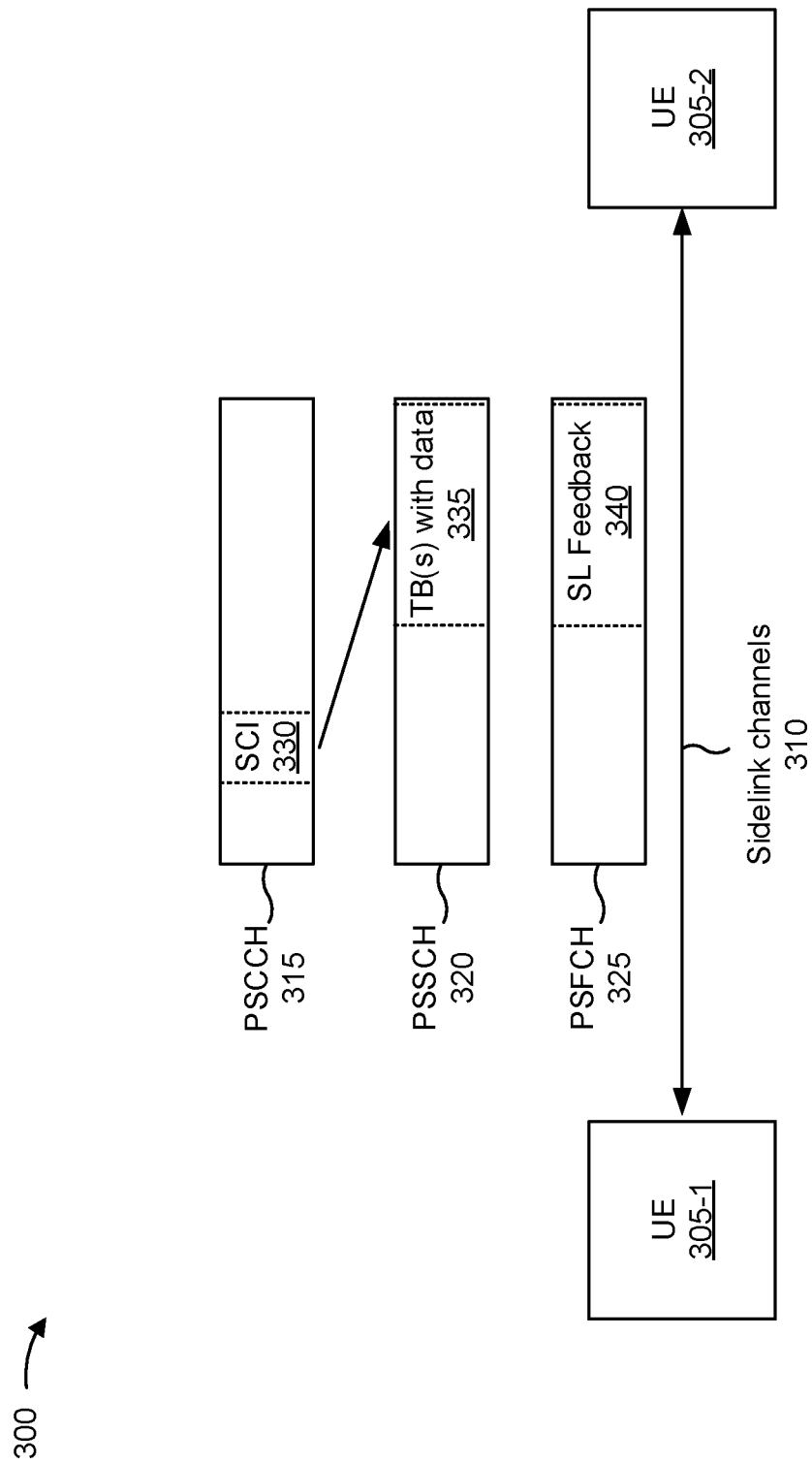
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing. In some aspects, the UE 305 may operate using a first resource allocation mode where the base station 110 may be responsible for scheduling (e.g., allocating) resources for use by the UE 305.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. A resource pool is a set of resources that UEs are configured to use for sidelink communications. A resource pool may include a set of sub-channels and a set of slots. Resource pools may also be configured with various parameters, such as a resource allocation mode, as described elsewhere herein. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, the UE 305 may operate using a second resource allocation mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 may use for a particular set of subframes).

In the second resource allocation mode, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
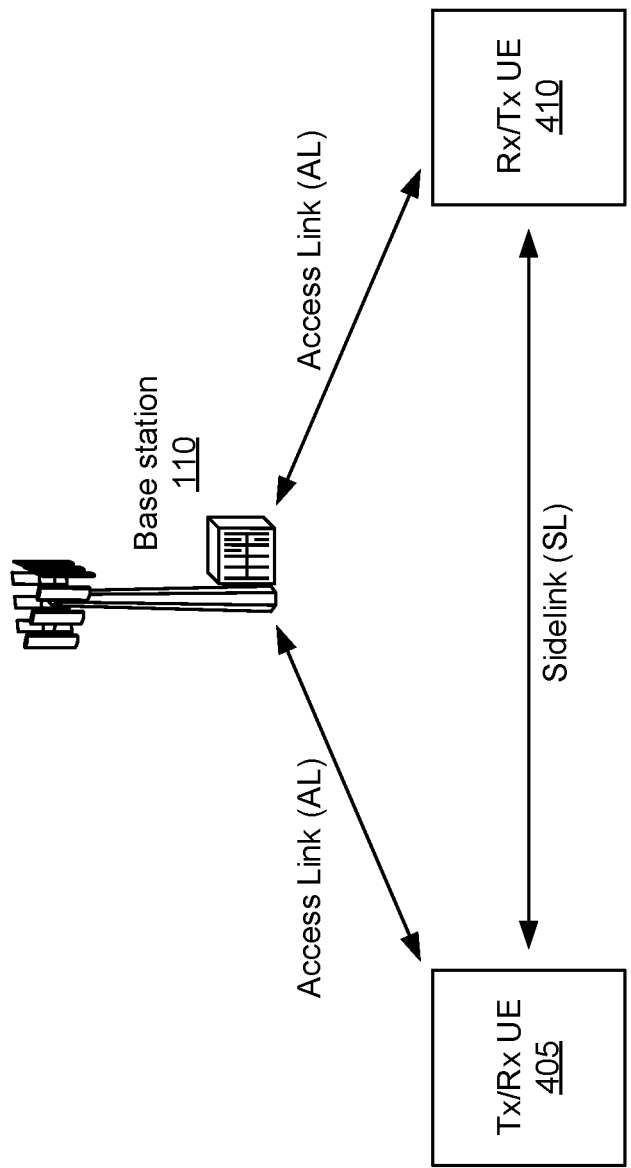
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
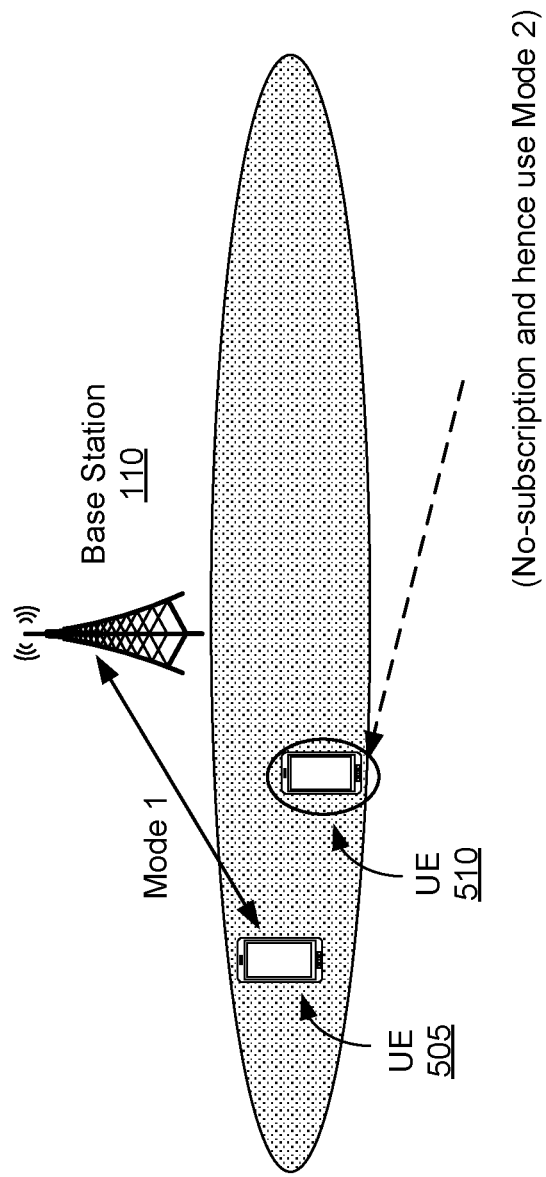
FIG. 5 is a diagram illustrating an example of resource pool sharing, in accordance with the present disclosure.

FIG. 5 is a diagram illustrating an example 500 of resource pool sharing, in accordance with the present disclosure.

As shown in FIG. 5, one or more UEs (e.g., UE 502 and UE 504) may be associated with a base station (e.g., base station 110). UE 502 and UE 504 may operate according to one or more resource allocation modes (e.g., sidelink resource allocation modes). For example, UE 502 may operate according to a first resource allocation mode and UE 504 may operate according to a second resource allocation mode. In the first resource allocation mode, the base station 110 may be responsible for scheduling (e.g., allocating) resources for use by the UE 502. In the second resource allocation mode, resources may be scheduled among UE 502 and UE 504 based at least in part on channel sensing (e.g., without the need for the base station 110 to allocate the resources), such as by measuring one or more of the RSSI, RSPS, and RSRQ parameters as described above in connection with FIG. 3. Communications using the first resource allocation mode may be referred to as Mode 1 communications, and communications using the second resource allocation mode may be referred to as Mode 2 communications. In this example, UE 502 may support Mode 1 communications, and UE 504 may support Mode 2 communications. However, it is understood that a UE, including UE 502 and UE 504, may support any one of the resource allocation modes. Additionally, a UE may be configured to support more than one of the resource allocation modes. For example, UE 502 and/or UE 504 may support both Mode 1 communications and Mode 2 communications. It is also understood that the number of resource allocation modes is not limited to the first resource allocation mode and the second resource allocation mode.

A resource pool is a collection of resources that are configured by a base station (e.g., base station 110) for UEs to perform sidelink communication. In some aspects, the resources of the resource pool may be shared among two or more UEs. A resource pool is typically configured as one of a resource pool that supports a first resource allocation mode (e.g., a resource pool that supports Mode 1 communication) or as a resource pool that supports a second resource allocation mode (e.g., a resource pool that supports Mode 2 communication). Resource pool sharing may be enabled to allow devices operating according to different resource allocation modes to share resources in the resource pool. In the example of FIG. 5, resource pool sharing may enable a UE operating in accordance with the first resource allocation mode (e.g., UE 502) to share resources with a UE operating in accordance with the second resource allocation mode (e.g., UE 504). In some examples, a shared resource pool may be configured as a resource pool that supports both of the first resource allocation mode and the second resource allocation mode. In some other examples, a shared resource pool may be configured as a first resource pool and a second resource pool that are at least partially overlapped with each other, where the first resource pool supports the first resource allocation mode and the second resource pool supports the second resource allocation mode. In this example, the overlapped portion of the first resource pool and the second resource pool may be referred to as a shared resource pool.

As described herein, resource pool sharing may enable devices operating according to different resource allocation modes to share resources within a resource pool. However, resource pool sharing is associated with certain challenges.

As a first example, it may be beneficial to enable a UE operating in accordance with the first resource allocation mode to transmit (e.g., report), to a base station, information regarding the use of resources by UEs operating in accordance with the second resource allocation mode. For example, this information may facilitate the scheduling of grants for Mode 1 resource allocations by the base station based at least in part on a channel busy report (CBR), as described in more detail elsewhere herein. However, it may be difficult for a UE to differentiate whether another UE communicating in a shared resource pool (or in multiple overlapped resource pools associated with different resource allocation modes) is using the first resource allocation mode or the second resource allocation mode, which impedes the reporting of information regarding the use of resources by UEs operating in accordance with the second resource allocation mode. Thus, scheduling by UEs operating in accordance with the first resource allocation mode may be impeded when shared resource pools are used, which reduces throughput and decreases the efficiency of sidelink communications.

As a second example, a UE may transmit (e.g., report) channel sensing results regarding other UEs to a base station to aid in, for example, collision avoidance scheduling. For a shared resource pool, this may entail the reporting of information regarding one or more of UEs associated with the base station (e.g., Mode 1 UEs controlled by the base station), UEs associated with other base stations (e.g., Mode 1 UEs controlled by other base stations), and UEs operating in accordance with the second configuration mode (e.g., Mode 2 UEs). As the number of devices sharing the resource pool grows, the reporting requirements for the UE transmitting the channel sensing results become large and complex, resulting in bandwidth constraints and delays in communication. Such delays may have major ramifications. For example, in the V2X scenario, any delay in communication increases the likelihood of an accident occurring between vehicles.

As a third example, resource pool sharing may be used by two or more nearby base stations performing scheduling in accordance with the first resource allocation mode. For example, a first base station and a second base station may coordinate resources to be allocated among devices (e.g., Mode 1 UEs) in the same resource pool or in overlapped resource pools. However, base stations have imperfect coordination. Thus, traditional techniques for coordinating traffic within a resource pool (e.g., using priorities configured for sidelink resources, communications, UEs, etc.) may not adequately address the coordination of communications within a shared resource pool where multiple base stations are responsible for resource allocation, which may lead to sub-optimal utilization of sidelink resources, interference between communications, and decreased throughput.

Some techniques and apparatuses described herein facilitate the co-existence of UEs operating in accordance with different resource allocation modes in a resource pool. A first UE may be configured to transmit, to a second UE (e.g., a receiver UE) in the resource pool, an indication that is based at least on part on the resource allocation mode. For example, the first UE may transmit, to the second UE, sidelink control information (SCI) that includes an indication that the first UE is operating in accordance with the first resource allocation mode and/or the second resource allocation mode. In some aspects, the indication may indicate a base station associated with the first UE (e.g., a serving base station of the first UE, or a base station that controls the first UE). The indication may enable the second UE to determine whether the first UE is operating in the first resource allocation mode or the second resource allocation mode, to determine a base station associated with the first UE, or to perform prioritization within a shared resource pool based at least in part on the indication, among other examples described herein. In some aspects, the indication may be referred to as a channel access color (CAC).

In some aspects, the indication may enable the UE operating in accordance with the first resource allocation mode to receive an indication of available resources (e.g., from a base station), and to coordinate the allocation of those resources amongst other UEs (e.g., UEs operating in accordance with the second resource allocation mode). In some aspects, the indication may indicate a priority of certain resources that are available in the resource pool.

Using the indication, the UE may be configured to report loading contributions to complement legacy CBR measurements. For example, a UE operating in accordance with the first resource allocation mode may report (e.g., to a base station) information regarding one or more resources that are being used by UEs operating in accordance with the second resource allocation mode, such as a loading contribution of UEs operating in the second resource allocation mode associated with a CBR measurement. The indication may therefore improve the scheduling among the UEs, thereby increasing throughput and improving the efficiency of sidelink communications.

Using the indication, the UE may be configured to report channel sensing results to the base station to assist the base station in performing scheduling (e.g., collision avoidance scheduling in the V2X scenario). Reporting efforts may be reduced when the UE can identify, using channel sensing, whether an overheard UE is under control of the UEs serving base station. The indication may therefore reduce the reporting overhead for the UE reporting the channel sensing results, thereby requiring less bandwidth and decreasing delays in communication between the UEs (e.g., Mode 1 UEs) and the base station.

In some aspects, two or more base stations may coordinate pool sharing amongst different resource pools using the indication. Pool sharing may be implemented even without perfect coordination between the base stations (e.g., imperfect coordination due to backhaul congestion). Using the indication, the UE may perform back-off operations when competing with another device for channel access using the same sidelink priority. The indication may therefore be used by two or more base stations to coordinate traffic, thereby improving coordination and prioritization of resources in a shared resource pool.

The indication may serve other additional or alternative purposes, as described further herein. These features associated with the indication, among others discussed herein, reduce the reporting requirements of UEs in the resource pool and facilitate the co-existence of UEs operating in accordance with different resource allocation modes in the resource pool. These features reduce bandwidth requirements and minimize delays in transmissions, thereby improving the quality of communication amongst the UEs.

As indicated above, FIG. 5 is provided as an example. Other examples may differ from what is described with respect to FIG. 5.

Figure 6:
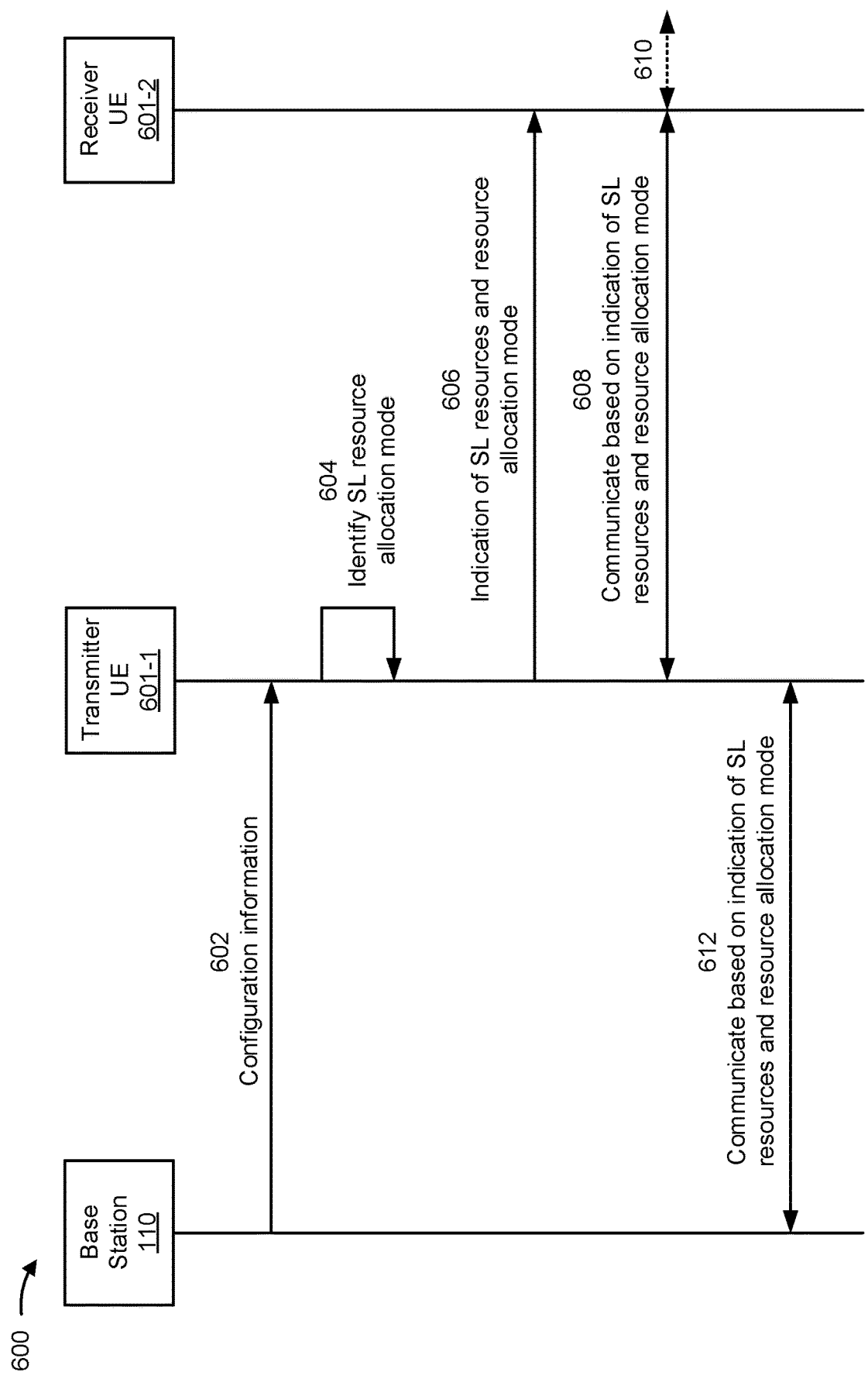
FIG. 6 is a diagram illustrating an example associated with resource allocation mode indication for resource pool sharing, in accordance with the present disclosure.

FIG. 6 is a diagram illustrating an example 600 of resource allocation mode indication for resource pool sharing, in accordance with the present disclosure. As shown in FIG. 6, a base station, such as the base station 110, and one or more UEs, such as transmitter UE 601-1 and receiver UE 601-2, are in communication. The terms "transmitter UE" and "receiver UE" are used for explanatory purposes, and each of the transmitter UE 601-1 and the receiver UE 601-2 may transmit or receive information, including but not limited to resource allocation mode information. For example, each of the transmitter UE 601-1 and the receiver UE 601-2 may have all or some of the features of the UE 120 shown in FIG. 1.

Example 600 is an example where the transmitter UE 601-1 provides an indication based at least in part on a resource allocation mode associated with one or more sidelink resources. The indication may additionally or alternatively indicate a base station that granted the one or more sidelink resources for the transmitter UE 601-1. The receiver UE 601-2 and/or the transmitter UE 601-1 may use such indications for various purposes, such as identifying the resource allocation mode used to select a set of sidelink resources, generating a report regarding sidelink resources, and/or prioritizing communications associated with different indications, as described below.

As shown in connection with reference number 602, the base station 110 may transmit configuration information to the transmitter UE 601-1. The configuration information may include an indication of a resource allocation mode. The resource allocation mode may indicate a manner in which one or more resources are allocated for use by a UE. For example, the configuration information may indicate one or more resources that are available for use by the transmitter UE 601-1. Additionally, or alternatively, the configuration information may indicate one or more resources that are available for use by other UEs, such as receiver UE 601-2. Furthermore, the configuration information may indicate whether the one or more resources are allocated using a first resource allocation mode or a second resource allocation mode. As used herein, the term "resource" includes, but is not limited to, a "sidelink resource." In other words, the one or more resources may be one or more sidelink resources, and the resource allocation mode(s) may be sidelink resource allocation mode(s).

In some aspects, the indication of the resource allocation mode, provided via the configuration information, may differ from an indication transmitted by the transmitter UE 601-1 (such as the indication described in connection with reference number 606, below). For example, the configuration information shown by reference number 602 may include an indication of a sidelink resource allocation mode for a UE 601 or for a set of resources. The transmitter UE 601-1 may transmit an indication based at least in part on the sidelink resource allocation mode, as described in more detail in connection with reference number 606. In some aspects, the indication provided via the configuration information may have the same value as the indication transmitted by the transmitter UE 601-1. For example, the base station 110 may provide a value of the indication that the transmitter UE 601-1 is to use. In some other aspects, the indication provided via the configuration information may have a different value or may be a different type of indication than the indication transmitted by the transmitter UE 601-1. For example, the configuration information may indicate a rule for selecting an indication at the transmitter UE 601-1. The indication transmitted by the transmitter UE 601-1 may also convey information identifying the base station 110, as described in more detail below.

As mentioned above, in some aspects, the configuration information may provide a value of an indication for transmission by the UE transmitter 601-1 or a rule for determining an indication at the UE transmitter 601-1. The indication, transmitted by the transmitter UE 601-1, indicates whether one or more of the resources are allocated using a first resource allocation mode or a second resource allocation mode. For example, the indication may indicate that the one or more resources are allocated using a first resource allocation mode (e.g., Mode 1) in which the resources are scheduled by a base station. Additionally, or alternatively, the indication may indicate that the one or more resources are allocated using a second resource allocation mode (e.g., Mode 2) in which resources are scheduled among the UEs based at least in part on channel sensing (e.g., without the need for the base station to allocate the resources). In some aspects, the indication may indicate a base station that allocated the one or more resources, as described in more detail below.

In some aspects, transmitter UE 601-1 is configured to support Mode 1 communications and receiver UE 601-2 is configured to support Mode 2 communications. However, in some aspects, a UE (including transmitter UE 601-1 and/or receiver UE 601-2) may be capable of supporting any one of the resource allocation modes. Additionally, a UE may be configured to support more than one of the resource allocation modes. For example, transmitter UE 601-1 and/or receiver 601-2 may support both Mode 1 communications and Mode 2 communications in example 600. Also, the number of resource allocation modes is not limited to the first resource allocation mode and the second resource allocation mode, and any number of resource allocation modes are possible, such as other resource allocation modes of an NR sidelink RAT or one or more resource allocation modes of another RAT, such as LTE. For example, a resource allocation mode may include a Mode 3 resource allocation mode or a Mode 4 resource allocation mode.

Mode 3 and Mode 4 resource allocation modes were designed for use in the V2X scenario, and are similar to the Mode 1 and Mode 2 resource allocation modes, respectively. For example, using the Mode 3 resource allocation mode, the cellular network may select and manage the radio resources used by vehicles for their direct V2V communications. Using the Mode 4 resource allocation mode, the vehicles themselves may autonomously select the radio resources for their direct V2V communications. However, while the Mode 1 and Mode 2 resource allocation modes emphasize long battery life of mobile devices, the Mode 3 and Mode 4 resource allocation modes emphasize highly reliable and low latency communications that are adapted to the V2X use cases.

In some aspects, the configuration information may relate to one or more resource pools. For example, the configuration information may configure or update a configuration of a resource pool (e.g., a resource pool configuration) usable by the transmitter UE 601-1 and/or the receiver UE 601-2. In some aspects, configuration information for a resource pool may include information indicating time resources for the resource pool, frequency resources for the resource pool, a size of a sub-channel in the frequency domain, and/or one or more resource allocation modes of the resource pool, among other parameters.

In some aspects, information identifying the indication to be transmitted by the transmitter UE 601-1 is transmitted as part of a resource pool configuration. Additionally, or alternatively, the resource pool configuration may be used to determine the indication. For example, the transmitter UE 601-1 may receive information identifying an indication or a sidelink resource allocation mode via Layer 3 (L3) configuration information associated with the resource pool, including but not limited to system information block (SIB) information, physical sidelink broadcast channel (PSBCH) information, or radio resource control (RRC) information. The configuration of the resource pool may indicate whether the resource pool supports the first resource allocation mode (e.g., Mode 1) and/or the second resource allocation mode (e.g., Mode 2). If the resource pool supports Mode 1, then UEs supporting Mode 1 resource allocation may communicate via resources of the resource pool. If the resource pool supports Mode 2, then UEs supporting Mode 2 resource allocation may communicate via resources of the resource pool, such as by autonomously selecting resources for communication. If the resource pool supports both Mode 1 and Mode 2, then UEs supporting Mode 1 may communicate via resources of the resource pool (such as based at least in part on a base station granting a resource for a communication) and UEs supporting Mode 2 may communicate via resources of the resource pool (such as by autonomously selecting resources for communication).

As mentioned above, in some aspects, the configuration information may indicate one or more rules for the identification (e.g., selection) of an indication by the transmitter UE 601-1. In some aspects, a rule may indicate to select an indication based at least in part on a resource allocation mode used to select a resource. Additionally, or alternatively, a rule may indicate to select an indication based at least in part on a base station that granted a resource for Mode 1 based communication. Additionally, or alternatively, a rule may indicate to select an indication based at least in part on another factor. Some examples of indicators that can be determined using a rule include an indicator (e.g., "Z") that indicates that the transmitter UE 601-1 uses Mode 2 resource allocation to select a set of resources, an indicator (e.g., "Y") that indicates that the set of resources are associated with a grant from the base station 110 to perform Mode 1 based channel access, and an indicator (e.g., "X") that indicates that the set of resources are associated with a grant from a different base station to perform Mode 1 based channel access. Other examples include an indicator (e.g., "W") that indicates that a UE that supports a Mode 1 based resource allocation mode is using a Mode 2 based resource allocation mode, and an indicator (e.g., "V") that indicates when a power saving channel access scheme is being used (such as a partial sensing scheme or a no-sensing scheme for resource selection).

In some aspects, as mentioned above, the base station 110 may transmit information indicating a value of an indication to be transmitted by the transmitter UE 601-1. For example, the value of the indication may identify the base station 110. In some aspects, the value of the indication may be provided using an L3 indicator (e.g., via the configuration information or other RRC signaling), a semi-static L2 indicator (e.g., via MAC layer signaling), or a dynamic L1 indicator (e.g., via downlink control information).

In some aspects, the base station 110 transmits, to the transmitter UE 601-1, information indicating one or more resources as recommended resources. For example, the base station 110 may transmit, to the transmitter UE 601-1, information indicating one or more recommended resources that are "granted" by the base station 110. As discussed further in connection with FIG. 7, the receiver UE 601-2 may thereafter receive information identifying the recommended resources, with an indication of Mode 1 resource allocation, on a sidelink communication from the transmitter UE 601-1. In other words, the base station 110 may determine the one or more resources that will be used by the receiver UE 601-2. In some aspects, the base station 110 may grant resources for use by the transmitter UE 601-1, and the transmitter UE 601-1 may allocate or indicate the granted resources as recommended resources for the receiver UE 601-2.

As shown in connection with reference number 604, the transmitter UE 601-1 may identify or determine a resource allocation mode associated with one or more resources. For example, the transmitter UE 601-1 may identify a resource allocation mode associated with the one or more resources indicated by the base station 110 as being available (e.g., based at least in part on the one or more resources being included in a resource pool configured with the resource allocation mode, based at least in part on the configuration information, etc.). In some aspects, the one or more resources may be associated with the first resource allocation mode. In some aspects, the one or more resources may be associated with the second resource allocation mode. In some aspects, a first portion of the resources may support the first resource allocation mode and a second portion of the resources may support the second resource allocation mode. In some aspects, one or more of the resources may support more than one resource allocation mode, such as supporting both the first resource allocation mode and the second resource allocation mode. In some aspects, the resource allocation mode may be identified based at least in part on the resource pool configuration received from the base station 110. In some aspects, "identifying a resource allocation mode of a resource" or "determining a resource allocation mode of a resource" may refer to selecting or scheduling the resource for communication using a resource allocation mode.

As shown in connection with reference number 606, the transmitter UE 601-1 transmits, to the receiver UE 601-2, an indication associated with the one or more resources. In some aspects, the indication may be included in sidelink control information (SCI) to be transmitted and received among UEs, such as between the transmitter UE 601-1 and the receiver UE 601-2. In other words, SCI reserving the one or more resources for a communication may include the indication of the underlying resource allocation mode of the one or more resources. In some aspects, the transmitter UE 601-1 sends information identifying one or more resources that are available for use by the receiver UE 601-2, and the indication may be transmitted with the information identifying the one or more resources. In some aspects, the transmitter UE 601-1 sends information identifying one or more resources that are being used by the transmitter UE 601-1 (e.g., a reservation for the one or more resources), and the indication may be transmitted with the information identifying the one or more resources.

As mentioned above, in some aspects, the indication may indicate whether the one or more resources are associated with (e.g., were allocated using) the first resource allocation mode and/or the second resource allocation mode. In some aspects, the indication may indicate whether the one or more resources are scheduled by a base station, including but not limited to the base station 110. For example, the indication may indicate the base station that scheduled the one or more resources using Mode 1 resource allocation. In some aspects, transmitting the indication may include transmitting an indication of a resource pool, such as the indication of the resource pool received by the transmitter UE 601-1 from the base station 110. The indication of the resource pool may include an indication of whether the resource pool supports the first resource allocation mode or the second resource allocation mode.

In some aspects, the indication may be associated with one or more recommended resources. For example, the transmitter UE 601-1 may transmit information indicating that one or more resources of the resource pool are recommended resources. In this case, the transmitter UE 601-1 may transmit an indication that indicates a resource selection mode associated with the one or more resources and/or a base station that allocated the one or more resources for the transmitter UE 601-1. In some aspects, information indicating the recommended resources may be based at least in part on an indication or grant of the recommended resources received from the base station 110. In some other aspects, the transmitter UE 601-1 may autonomously select one or more resources as recommended resources. In some aspects, the transmitter UE 601-1 may transmit, to the receiver UE 601-2, an indication of the one or more recommended resources. The receiver UE 601-2 may use the one or more recommended resources to communicate with other UEs, including but not limited to the transmitter UE 601-1. Additional description of communication using recommended resources is provided in connection with FIG. 7.

As shown in connection with reference number 608, the transmitter UE 601-1 and the receiver UE 601-2 communicate (e.g., using SCI or data communications) based at least in part on the indication of the one or more resources. For example, the transmitter UE 601-1 and the receiver UE 601-2 may communicate based at least in part on the resource allocation mode of the one or more resources. The receiver UE 601-2 may be configured to transmit, to the transmitter UE 601-1, an indication of a reservation associated with one or more resources. In some aspects, the receiver UE 601-2 may send, to the transmitter UE 601-1, an indication that the one or more resources are reserved for use by the receiver UE 601-2. In some aspects, the transmitter UE 601-1 may send, to the receiver UE 601-2, an indication that one or more resources have been reserved by the transmitter UE 601-1. The receiver UE 601-2 may therefore avoid transmission on those resources. Alternatively, as described below in connection with FIG. 9, the receiver UE 601-2 may transmit on the resources reserved by the transmitter UE 601-1 based at least in part on a priority of the resources. The one or more resources may be selected (e.g., reserved) by the receiver UE 601-2 based at least in part on the indication of the resource pool configuration received from the transmitter UE 601-1. Based at least in part on the reservation of the one or more resources, the receiver UE 601-2 may communicate with the transmitter UE 601-1 using the reserved resources. Additionally, or alternatively, the receiver UE 601-2 may communicate with any number of other UEs using the reserved resources, as shown by reference number 610.

In some aspects, the receiver UE 601-2 may transmit a communication on the one or more resources based at least in part on a priority associated with the one or more resources. As described below in connection with FIG. 10, the communication may be prioritized over another communication by the transmitter UE 601-1 based at least in part on a portion of a resource pool in which the one or more resources are located. Different portions of the resource pool may be associated with different priorities. In some aspects, the priority may be based at least in part on downlink control information received from the base station 110.

As shown in connection with reference number 612, the base station 110 and the transmitter UE 601-1 communicate based at least in part on the indication associated with the one or more available resources. In some aspects, the transmitter UE 601-1 may transmit, to the base station 110, an indication of the reservation of one or more resources indicated by the base station 110 as being available for use by the transmitter UE 601-1 and/or the receiver UE 601-2. For example, the transmitter UE 601-1 may transmit, to the base station 110, an indication of one or more resources reserved for use by the transmitter UE 601-1. Additionally, or alternatively, the transmitter UE 601-1 may transmit, to the base station 110, an indication of one or more resources reserved for use by the receiver UE 601-2.

In some aspects, a UE using the first resource allocation mode may report, to a base station, loading information (e.g., reserved resources) by UEs using a particular resource allocation mode (e.g., the second resource allocation mode). For example, the transmitter UE 601-1 may report, to the base station 110, one or more resources that are reserved by the receiver UE 601-2. In some aspects, a UE such as the transmitter UE 601-1 may be configured to report periodical reservations based at least in part on indications of a specific resource allocation mode. This may reduce the report size for the resource pool. Additional details regarding resource reservation reporting are described below in connection with FIG. 8.

In some aspects, a UE, such as the transmitter UE 601-1, may perform prioritization of communications based at least in part on the indication, sometimes referred to herein as "mode-dependent priority" or "resource allocation mode-dependent priority." Additional details regarding communication prioritization are described below in connection with FIG. 9.

In some aspects, the mode-dependent priority may be configured for channel access in a sub-pool of a resource pool instead of the whole resource pool, where a sub-pool includes a proper subset (e.g., fewer than all of) of the resources of the resource pool. Additional details regarding mode-dependent priority are described below in connection with FIG. 10.

In some aspects, two base stations may be configured to dynamically negotiate to arrive at non-sharing sub-pool(s). Additional details regarding non-sharing sub-pools are described below in connection with FIG. 11.

As described above, using indications associated with a resource allocation may reduce the reporting requirements of UEs in a resource pool and facilitate the co-existence of UEs operating in accordance with different resource allocation modes in the resource pool. These features reduce bandwidth requirements and minimize delays in transmissions, thereby improving the quality of communication amongst the UEs.

As indicated above, FIG. 6 is provided as an example. Other examples may differ from what is described with respect to FIG. 6.

Figure 7:
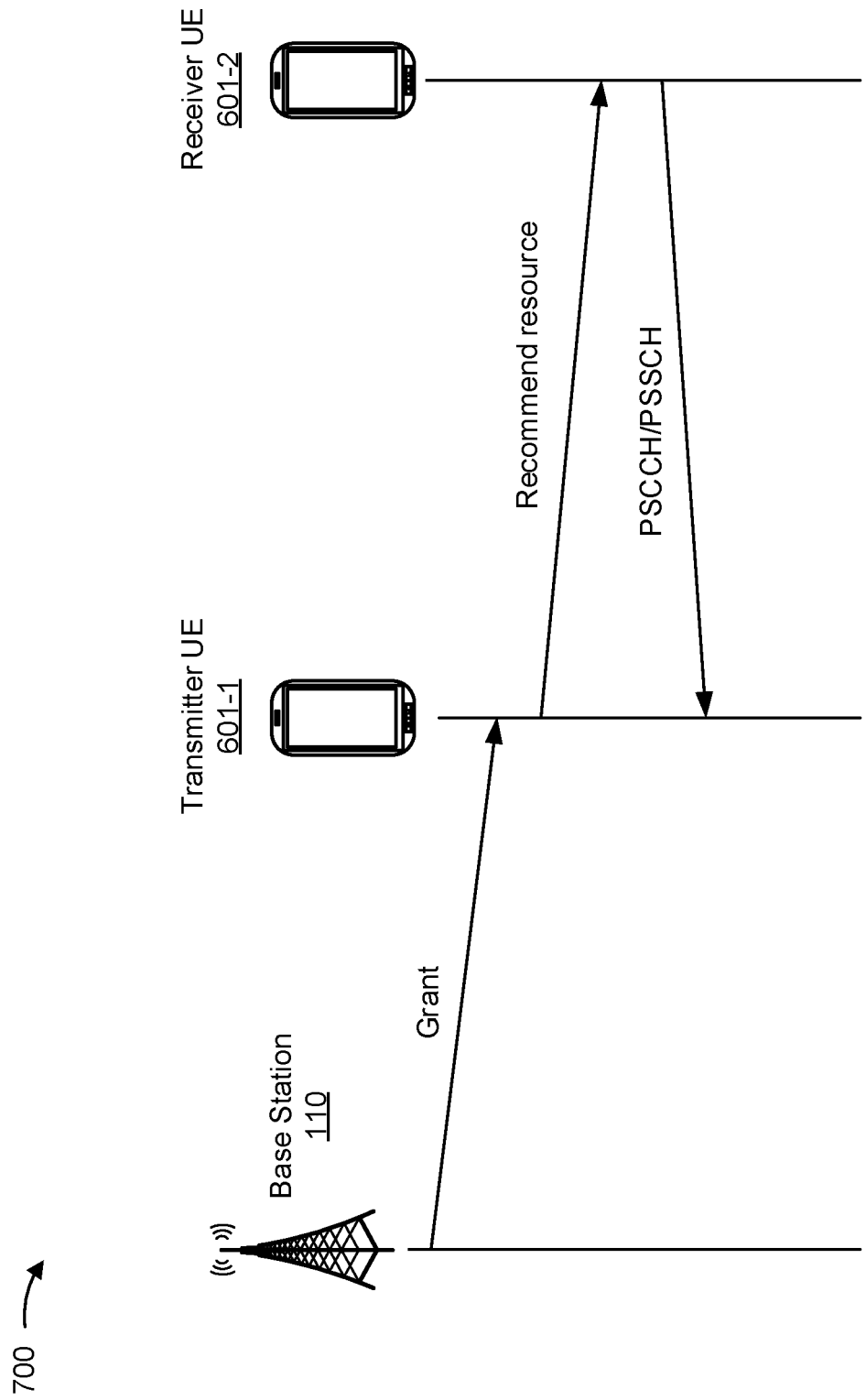
FIG. 7 is a diagram illustrating an example associated with resource allocation and recommended resources, in accordance with the present disclosure.

FIG. 7 is a diagram illustrating an example 700 of resource allocation and recommended resources, in accordance with the present disclosure. As shown in FIG. 7, the base station 110 may transmit, to the transmitter UE 601-1, information indicating one or more resources as recommended resources. A recommended resource is a resource that can be selected by the transmitter UE 601-1 for use by another UE. For example, the transmitter UE 601-1 may transmit information indicating recommended resources for a communication to the receiver UE 601-2. The receiver UE 601-2 may consider the recommended resources (e.g., in a non-binding fashion) when selecting resources. For example, the base station 110 may transmit, to the transmitter UE 601-1, information indicating one or more recommended resources that are "granted" by the base station 110. As discussed further in connection with FIG. 7, the receiver UE 601-2 may thereafter receive information identifying the recommended resources, with an indication of Mode 1 resource allocation, on a sidelink communication from the transmitter UE 601-1. In other words, the base station 110 may determine the one or more resources that will be used by the receiver UE 601-2. In some aspects, the base station 110 may grant resources for use by the transmitter UE 601-1, and the transmitter UE 601-1 may allocate or indicate the granted resources as recommended resources for the receiver UE 601-2.

In some aspects, the indication may be associated with one or more recommended resources. For example, the transmitter UE 601-1 may transmit information indicating that one or more resources of the resource pool are recommended resources. The transmitter UE 601-1 may transmit an indication that indicates a resource selection mode associated with the one or more resources and/or a base station that allocated the one or more resources for the transmitter UE 601-1. In some aspects, information indicating the recommended resources may be based at least in part on an indication or grant of the recommended resources received from the base station 110. In some other aspects, the transmitter UE 601-1 may autonomously select one or more resources as recommended resources. In some aspects, the transmitter UE 601-1 may transmit, to the receiver UE 601-2, an indication of the one or more recommended resources. In some aspects, the receiver UE 601-2 may transmit (e.g., in a PSCCH message or a PSSCH message), to the transmitter UE 601-1, an indication of the one or more recommended resources reserved by the receiver UE 601-2. The receiver UE 601-2 may use the one or more recommended resources to communicate with other UEs, including but not limited to the transmitter UE 601-1.

As indicated above, FIG. 7 is provided as an example. Other examples may differ from what is described with respect to FIG. 7.

Figure 8:
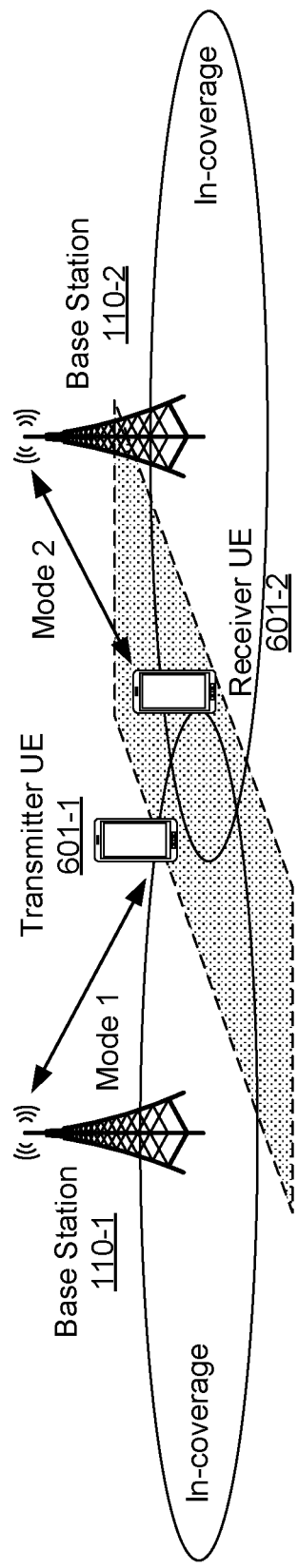
FIG. 8 is a diagram illustrating an example associated with resource reservation and resource pool sharing, in accordance with the present disclosure.

FIG. 8 is a diagram illustrating an example 800 of resource reservation and resource pool sharing, in accordance with the present disclosure. In some aspects, a shared resource pool may be configured as a first resource pool and a second resource pool that are at least partially overlapped with each other, where the first resource pool supports the first resource allocation mode and the second resource pool supports the second resource allocation mode. As shown in FIG. 8, a UE using the first resource allocation mode may report, to a base station, loading information (e.g., reserved resources) by one or more UEs using the second resource allocation mode. For example, the transmitter UE 601-1 may report, to the base station 110-1, one or more resources that are reserved by the receiver UE 601-2.

In measuring the loading contributed from the receiver UE 601-2, a subchannel may be counted as "busy" if the detected SCI indicates use of the second resource allocation mode and the demodulation reference signal (DMRS)/reference signal received power (RSRP) is above a threshold. The loading information may indicate a number of subchannels counted as busy, particular subchannels counted as busy, a ratio of subchannels counted as busy, or the like. When there are only two resource allocation modes in the pool, and the transmitter UE 601-1 reports a relatively low loading contribution from UEs associated with the second resource allocation mode, the base station 110-1 can safely issue legacy grants to the transmitter UE 601-1 to pursue the benefits of central scheduling. As used herein, "legacy grant" refers to a grant (e.g., by the base station 110-1) for a specific resource. A legacy grant can be compared to a soft grant, which refers to a grant (e.g., by the base station 110-1) for multiple resources that are conditioned upon an outcome of the re-evaluation of those resources by one or more UEs (e.g., the transmitter UE 601-1 and the receiver UE 601-2). In other words, the transmitter UE 601-1 and the receiver UE 601-2 confirm whether the resources in the soft grant are available for use, and may select resources from the soft grant accordingly.

In some aspects, a UE such as the transmitter UE 601-1 may be configured to report periodical reservations based at least in part on indications of a specific resource allocation mode. This may reduce the report size for the resource pool. For example, the transmitter UE 601-1 may be configured to report periodical reservations having a priority within a specified range and/or periodical reservations overlapping with pre-defined time-frequency windows. Additionally, or alternatively, the transmitter UE 601-1 may send to the base station 110-1 information indicating that one or more reservations detected by the transmitter UE 601-1 do not correspond to the reservations indicated by the base station 110-1. For example, the maintained periodical reservation record may be arranged by zone, and the transmitter UE 601-1 may be triggered to send an update if there is a mismatch between the base station's record and what the transmitter UE 601-1 has overheard in the same zone. A zone may be a geographical area associated with an identifier. The zones may be configured by a base station (e.g., the base station 110) or may be preconfigured for one or more UEs (e.g., the transmitter UE 601-1 and/or the receiver UE 601-2).

As indicated above, FIG. 8 is provided as an example. Other examples may differ from what is described with respect to FIG. 8.

Figure 9:
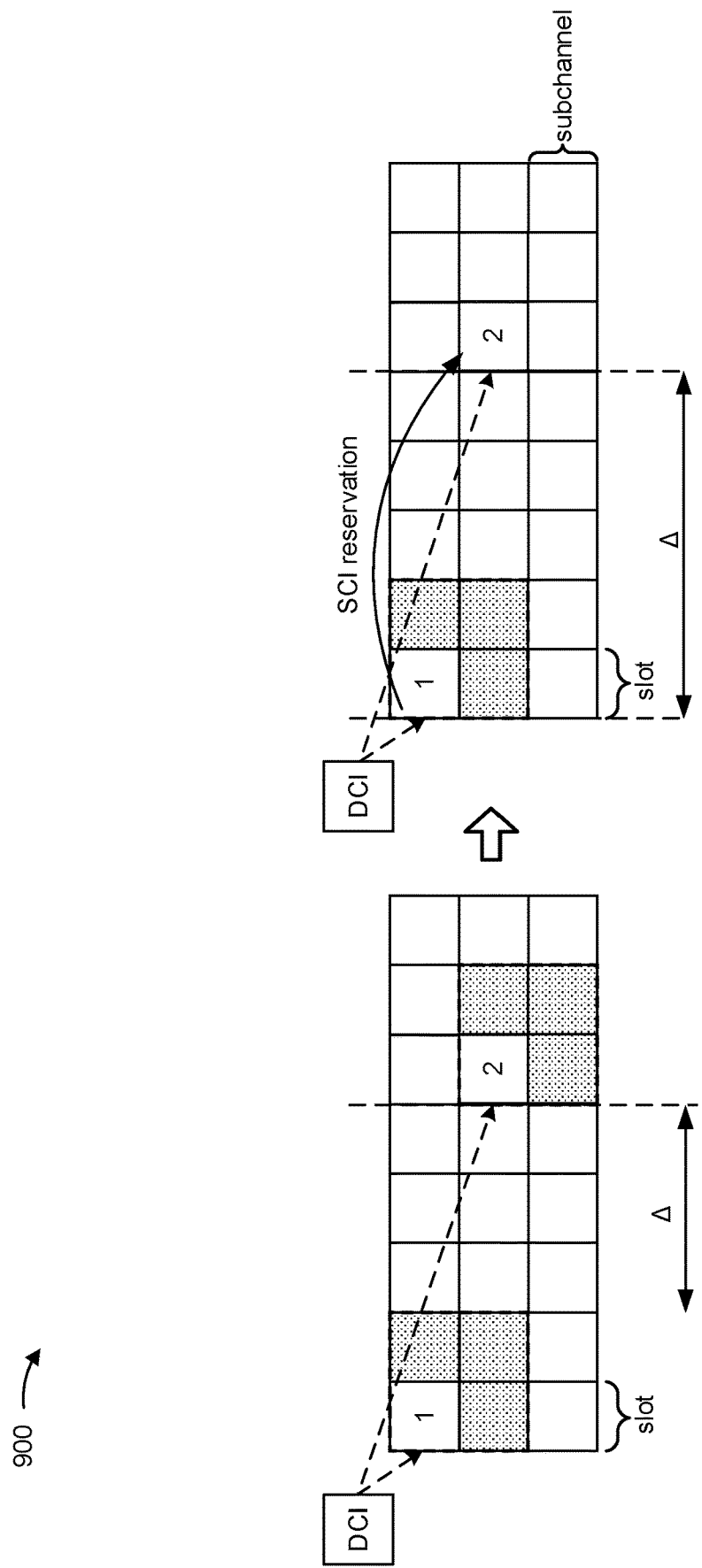
FIG. 9 is a diagram illustrating an example associated with mode-dependent resource priority, in accordance with the present disclosure.

FIG. 9 is a diagram illustrating an example 900 of mode-dependent resource priority, in accordance with the present disclosure. In some aspects, a UE, such as the transmitter UE 601-1, may perform prioritization of communications based at least in part on an indication, sometimes referred to herein as "mode-dependent priority" or "resource allocation mode-dependent priority." For example, a UE may be configured to perform additional sidelink resource allocation mode dependent priority on top of another form of sidelink priority (such as based at least in part on a priority of a resource, of a UE, or of a communication). The UE may determine whether to prioritize a communication (e.g., proceed with transmitting a communication, or transmit the communication using a first, higher power level) on a set of resources based at least in part on whether the indication has a particular value relative to another indication, received by the UE, associated with the set of resources. As an example, when attempting access with resource allocation mode "a" and a priority "r", a UE may reduce transmit power or decline to transmit a communication (e.g., "back-off" competition) from any UE that transmits an indication of a resource allocation mode in a specific range and a priority in another specific range. For example, a UE using the second resource allocation mode may be indicated to back-off to competition (e.g., to reduce transmit power or skip transmission) from a UE using the first resource allocation mode under the same sidelink priority.

In some aspects, a resource allocation may be indicated in downlink control information (DCI) sent by a base station (e.g., base station 110) towards a UE using the first resource allocation mode (e.g., transmitter UE 601-1). The resource allocation may include an indication of a "soft grant" of one or more resources. A soft grant is a grant from which resources for a communication can be selected by the UE. For example, the UE can select part or all of the resources of the soft grant for communication, for example, based at least in part on conditions at the UE. The transmitter UE 601-1 may transmit, to the receiver UE 601-2 (e.g., using SCI), an indication of the soft grant of the one or more resources. The receiver UE 601-2 may transmit, to the transmitter UE 601-1, based at least in part on the indication of the soft grant, an indication of a reservation of one or more of the resources. For example, as shown in FIG. 9, the receiver UE 601-2 may transmit, to the transmitter UE 601-1, an indication that resource 2 is being reserved for use by the receiver UE 601-2. Based at least in part on receiving the indication of the reservation from the receiver UE 601-2, the transmitter UE 601-1 may change (e.g., upgrade) the reservation of resource 2 from a soft grant to a legacy grant (as described above in connection with FIG. 8). In some aspects, there may be a minimum time offset between resources of different soft grants, as indicated by a delta symbol. Additionally, or alternatively, the transmitter UE 601-1 may transmit, to the base station 110, an indication that resource 2 has been reserved for use by the receiver UE 601-2. The base station 110, based at least in part on receiving the indication that resource 2 been reserved for use by the receiver UE 601-2, may change the grant of the resource 2 from a soft grant to a legacy grant.

As indicated above, FIG. 9 is provided as an example. Other examples may differ from what is described with respect to FIG. 9.

Figure 10:
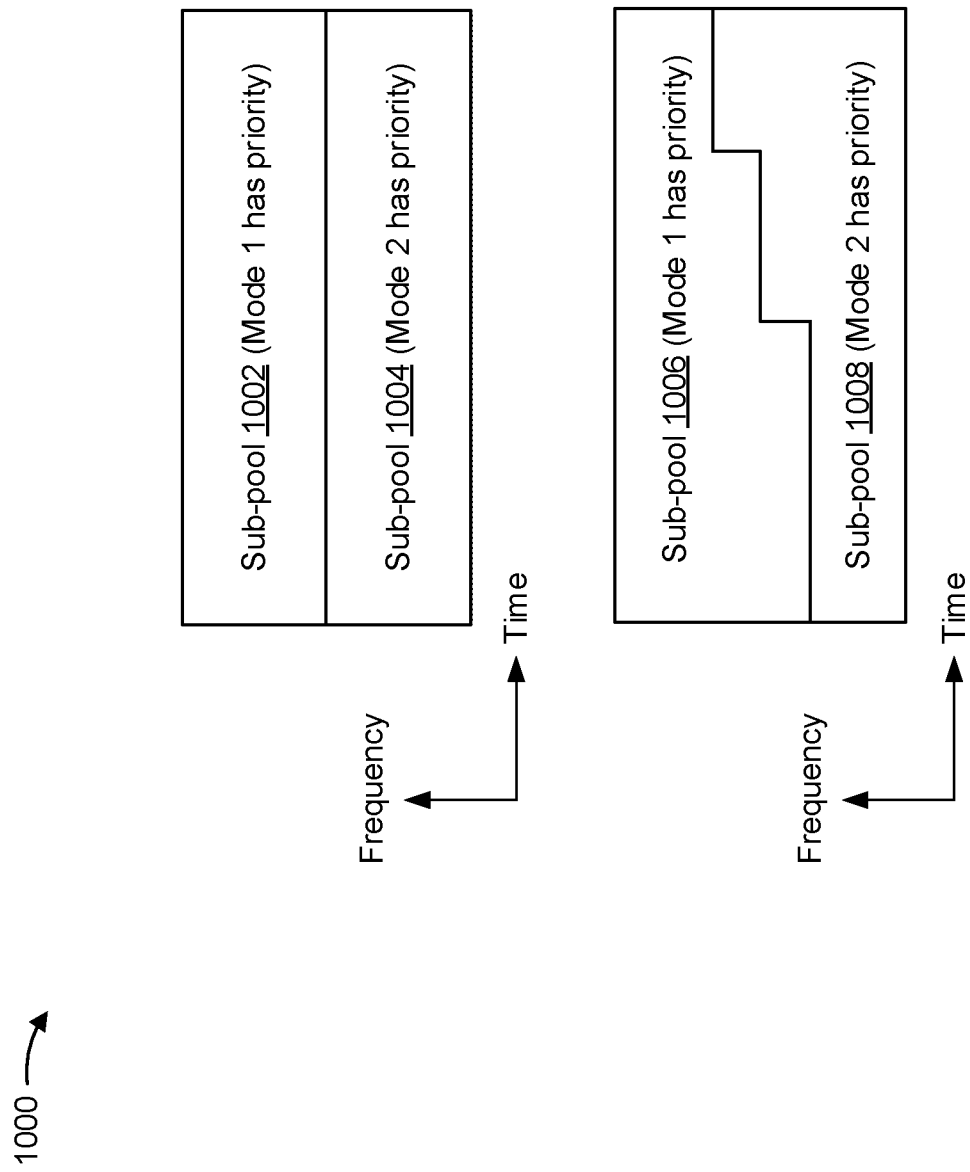
FIG. 10 is a diagram illustrating an example associated with resource sub-pools, in accordance with the present disclosure.

FIG. 10 is a diagram illustrating an example 1000 of resource sub-pools, in accordance with the present disclosure. In some aspects, the mode-dependent priority may be configured for channel access in a sub-pool of a resource pool instead of the whole resource pool, where a sub-pool includes a proper subset (e.g., fewer than all of) of the resources of the resource pool. As shown in FIG. 10, a resource pool may include a first resource sub-pool 1002 and a second resource sub-pool 1004. The resources of the first resource sub-pool 1002 may prioritize communications using the first resource allocation mode (e.g., Mode 1). The resources of the second resource sub-pool 1004 may prioritize communications using the second resource allocation mode (e.g., Mode 2). Additionally, or alternatively, the resources of the first resource sub-pool 1002 may prioritize communications associated with a first indication (e.g., corresponding to a first base station) and the resources of the second resource pool 1004 may prioritize communications associated with a second indication (e.g., corresponding to a second base station). The resources of the first resource sub-pool 1002 and the second resource sub-pool 1004 may be multiplexed together using, for example, frequency division multiplexing and/or time division multiplexing. Frequency division multiplexed sub-pools may have their own frequency resources but may be overlapped in time, whereas time division multiplexed sub-pools may have their own time resources but may be overlapped in frequency. After receiving a grant from a base station (e.g., base station 110), a UE using the first resource allocation mode (e.g., transmitter UE 601-1) may execute resource allocation mode prioritization based at least in part on which sub-pool the granted resource sits.

In some aspects, the mode-dependent priority may be indicated in downlink control information (DCI) together with a soft grant sent by the base station 110 towards the transmitter UE 601-1. The transmitter UE 601-1 may be pre-configured in L3 with a "primary" and "secondary" resource allocation mode dependent priority indication. For example, the "primary" resource allocation mode dependent priority indication may indicate a higher priority (e.g., advantage) of a resource allocation mode (e.g., the first resource allocation mode) as compared to a "secondary" resource allocation mode dependent priority indication that indicates a lower priority (e.g., disadvantage) of a resource allocation mode (e.g., the second resource allocation mode). The base station 110 may indicate (e.g., in DCI) whether the "primary" or "secondary" set-up is to be applied to the soft grant. Using this DCI indication, two or more base stations may dynamically coordinate (e.g., over the backhaul/X2 interface) the sub-pool partitioning according to respective loading levels/contracts.

In some aspects, the mode-dependent priorities may be time-dependent. For example, as shown in FIG. 10, certain resources of the resource pool may be allocated to resource sub-pool 1006 for a first time period. During this first time period, a greater number of frequency resources may be allocated to resource sub-pool 1006 in which Mode 1 communications are prioritized. However, at a second time period, the certain resources of the resource pool may be allocated to resource sub-pool 1008. For example, the certain resources may be re-allocated from the first resource sub-pool 1006 to the second resource sub-pool 1008. During this second time period, a greater number of frequency resources may be allocated to resource sub-pool 1008 in which Mode 2 communications are prioritized.

As indicated above, FIG. 10 is provided as an example. Other examples may differ from what is described with respect to FIG. 10.

Figure 11:
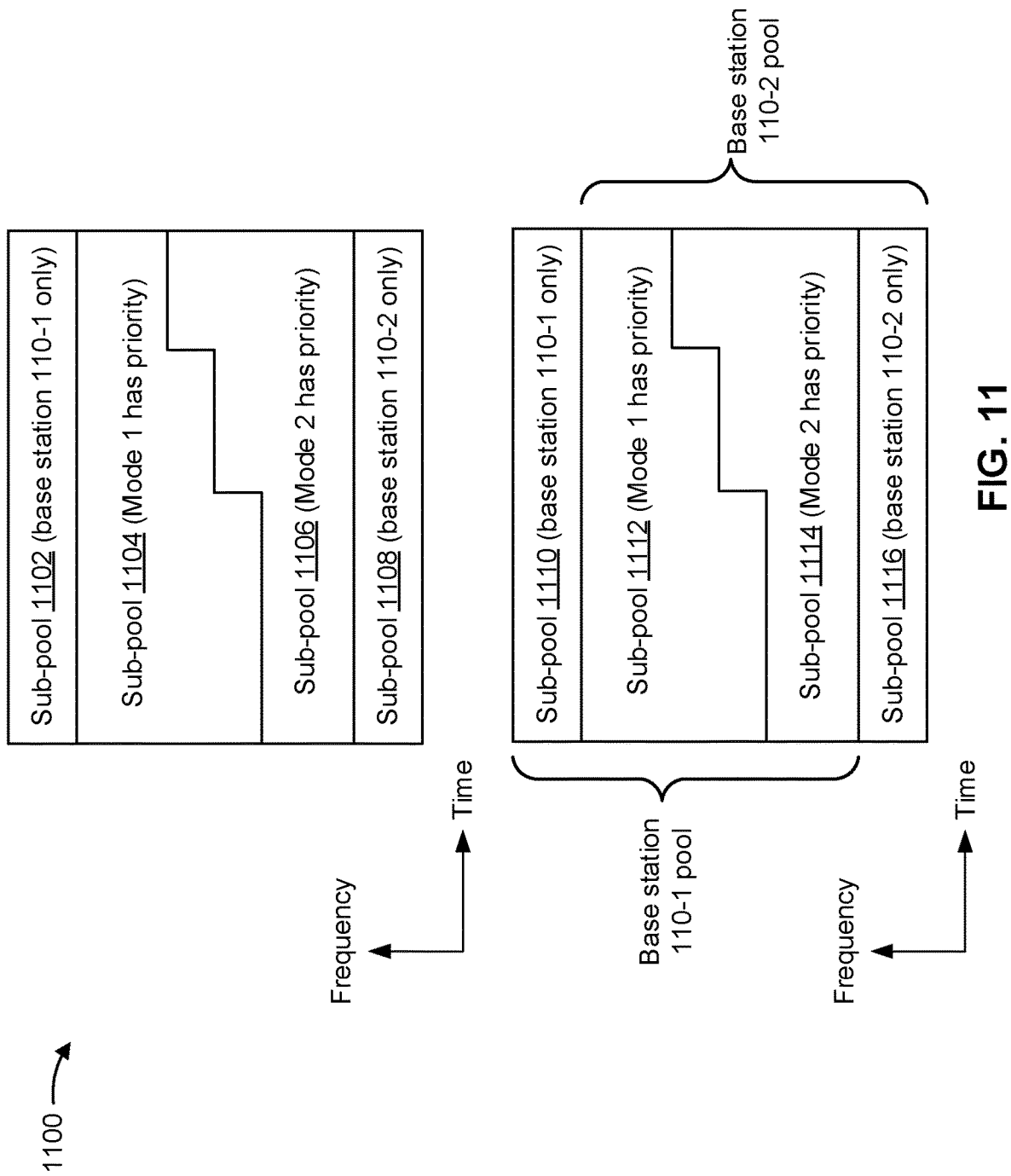
FIG. 11 is a diagram illustrating an example associated with non-sharing resource sub-pools, in accordance with the present disclosure.

FIG. 11 is a diagram illustrating an example 1100 of non-sharing resource sub-pools, in accordance with the present disclosure. In some aspects, resource pools may be shared among multiple base stations. For example, a resource pool may include resource sub-pool 1102, resource sub-pool 1104, resource sub-pool 1106, and resource sub-pool 1108. The resources of the resource sub-pool 1102 may be allocated for use by the base station 110-1. The resources of the resource sub-pool 1104 may be allocated for communications using the first resource allocation mode, or may prioritize communications associated with a first indication. The resources of the resource sub-pool 1106 may be allocated for communications using the second resource allocation mode, or may prioritize communications associated with a second indication. The resources of the resource sub-pool 1108 may be allocated for use by the base station 110-2.

In some aspects, the mode-dependent priorities may be time dependent. For example, certain resources of the resource pool may be allocated to resource sub-pool 1104 for a first time period. During this first time period, a greater number of frequency resources may be allocated to resource sub-pool 1104 in which Mode 1 communications are prioritized. However, at a second time period, the certain resources of the resource pool may be allocated to resource sub-pool 1106. For example, the certain resources may be re-allocated from the first resource sub-pool 1104 to the second resource sub-pool 1106. During this second time period, a greater number of frequency resources may be allocated to resource sub-pool 1106 in which Mode 2 communications are prioritized.

In some aspects, two base stations may be configured to negotiate (e.g., dynamically) to arrive at non-sharing sub-pool(s). The non-sharing sub-pools may be used to schedule a first transmission (e.g., later retransmissions in the shared sub-pool may not been needed) or the last transmission (e.g., under a tight packet delay budget). This may also be arranged via partially overlapped resource pools. In some aspects, certain resource sub-pools may be allocated for use only by particular base stations in a time-dependent manner. As shown in FIG. 11, during a first time period, the resources of resource sub-pool 1110, resource sub-pool 1112, and resource sub-pool 1114 may be allocated for use only by the base station 110-1. However, during a second time period, the resources of resource sub-pool 1112, resource sub-pool 1114, and resource sub-pool 1116 may be allocated for use only by the base station 110-2.

As indicated above, FIG. 11 is provided as an example. Other examples may differ from what is described with respect to FIG. 11.

Figure 12:
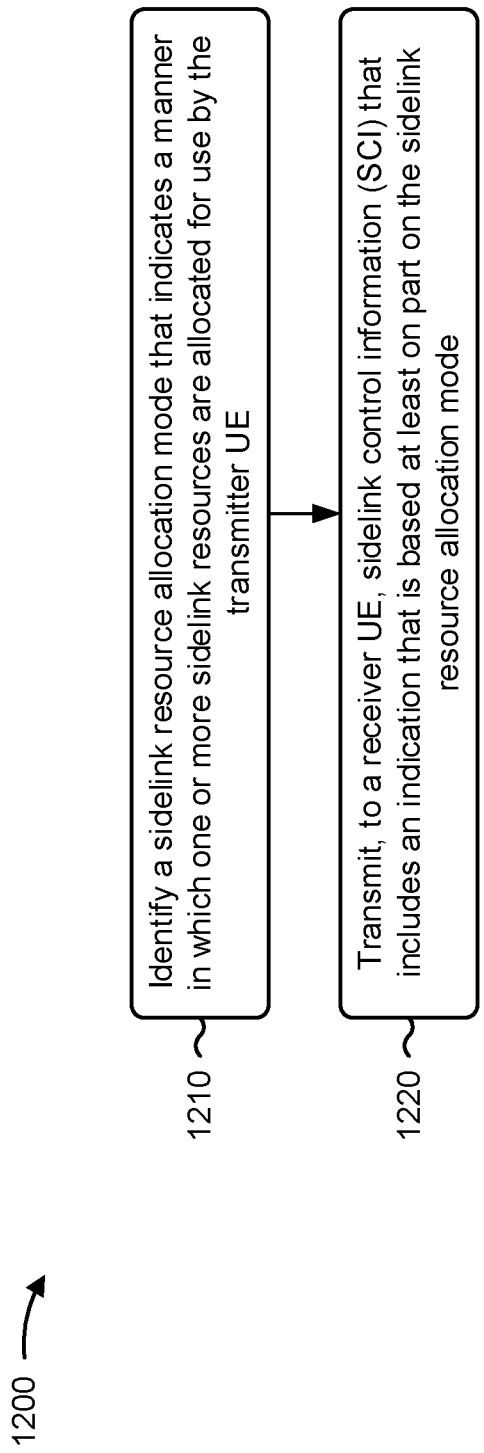
FIG. 12 is a diagram illustrating an example process associated with resource allocation mode indication for resource pool sharing, in accordance with the present disclosure.

FIG. 12 is a diagram illustrating an example process 1200 performed, for example, by a transmitter UE, in accordance with the present disclosure. Example process 1200 is an example where the transmitter UE (e.g., UE 120, UE 305, UE 405, UE 410, UE 505, transmitter UE 601-1) performs operations associated with resource allocation mode indication for resource pool sharing.

As shown in FIG. 12, in some aspects, process 1200 may include identifying a sidelink resource allocation mode that indicates a manner in which one or more sidelink resources are allocated for use by the transmitter UE (block 1210). For example, the transmitter UE (e.g., using communication manager 140 and/or identification component 1508, depicted in FIG. 15) may identify a sidelink resource allocation mode that indicates a manner in which one or more sidelink resources are allocated for use by the transmitter UE, as described above.

As further shown in FIG. 12, in some aspects, process 1200 may include transmitting, to a receiver UE, sidelink control information (SCI) that includes an indication that is based at least on part on the sidelink resource allocation mode (block 1220). For example, the transmitter UE (e.g., using communication manager 140 and/or transmission component 1504, depicted in FIG. 15) may transmit, to a receiver UE, sidelink control information (SCI) that includes an indication that is based at least on part on the sidelink resource allocation mode, as described above.

Process 1200 may include additional aspects, such as any single aspect or any combination of aspects described below and/or in connection with one or more other processes described elsewhere herein.

In a first aspect, the indication indicates whether the sidelink resource allocation mode is a first sidelink resource allocation mode in which the one or more sidelink resources are allocated by a base station or a second sidelink resource allocation mode in which the one or more resource is allocated based at least in part on channel sensing.

In a second aspect, alone or in combination with the first aspect, the indication is a first indication if the one or more sidelink resources are scheduled by a first base station or a second indication if the one or more sidelink resources are scheduled by a second base station.

In a third aspect, alone or in combination with one or more of the first and second aspects, process 1200 includes receiving a resource pool configuration that configures a resource pool from which one or more sidelink resources are selected, wherein the resource pool configuration indicates whether the resource pool supports a first sidelink resource allocation mode or a second sidelink resource allocation mode, and wherein the sidelink resource allocation mode is identified based at least in part on the resource pool configuration.

In a fourth aspect, alone or in combination with one or more of the first through third aspects, the one or more sidelink resources are selected from a resource pool that supports multiple sidelink resource allocation modes.

In a fifth aspect, alone or in combination with one or more of the first through fourth aspects, process 1200 includes receiving information indicating one or more of the sidelink resources as recommended resources, wherein the sidelink resource allocation mode is identified based at least in part on the information.

In a sixth aspect, alone or in combination with one or more of the first through fifth aspects, process 1200 includes transmitting, to a base station, information associated with one or more sidelink resources allocated for use by the receiver UE.

In a seventh aspect, alone or in combination with one or more of the first through sixth aspects, process 1200 includes transmitting, to the receiver UE, a communication having a priority that is based at least in part on the indication.

In an eighth aspect, alone or in combination with one or more of the first through seventh aspects, the priority is based at least in part on a portion of a resource pool in which the one or more sidelink resources are located, wherein different portions of the resource pool are associated with different priorities.

In a ninth aspect, alone or in combination with one or more of the first through eighth aspects, the priority is based at least in part on downlink control information.

In a tenth aspect, alone or in combination with one or more of the first through ninth aspects, at least one of the one or more sidelink resources is reserved for use by one of a first base station or a second base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
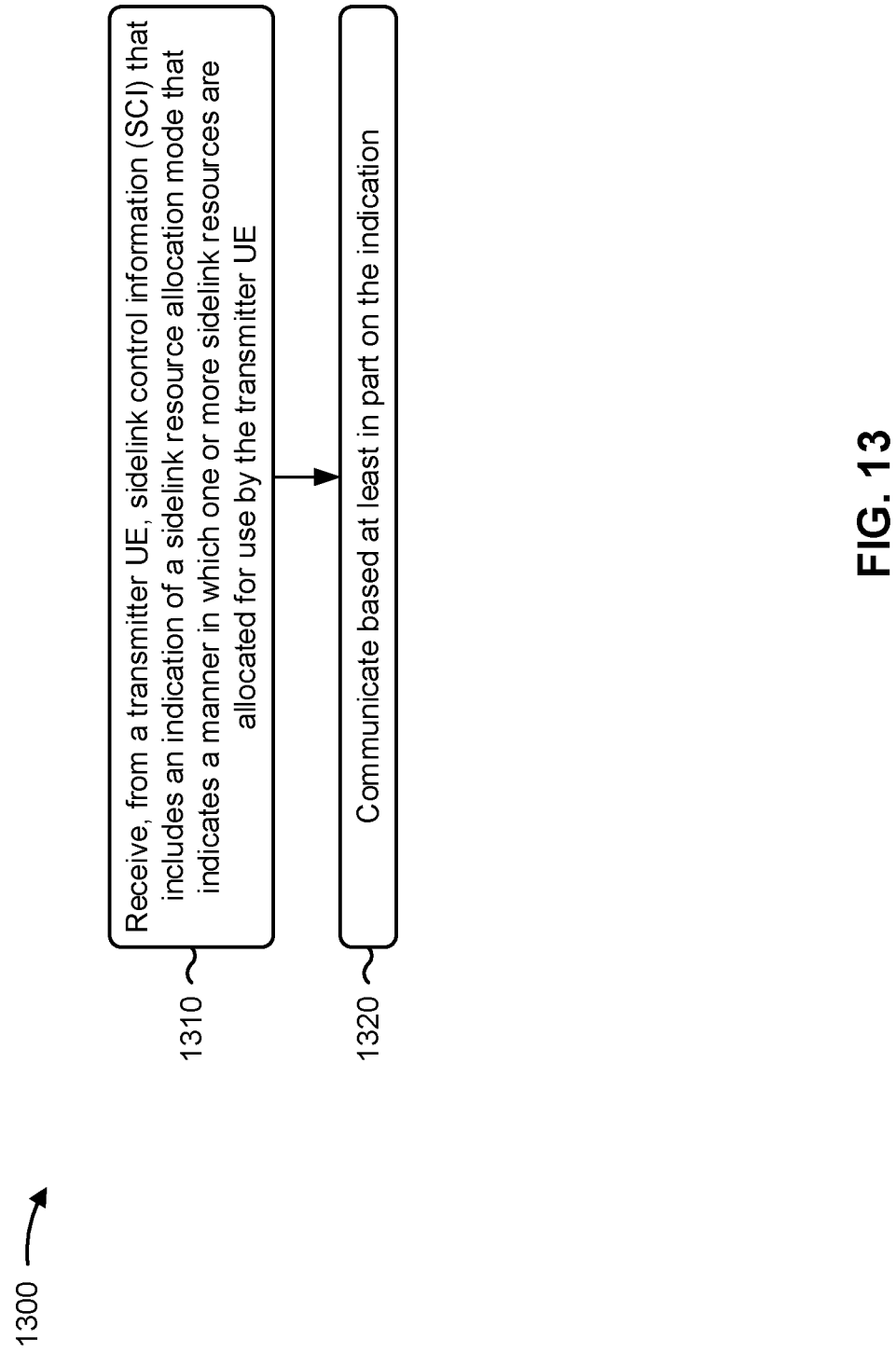
FIG. 13 is a diagram illustrating an example process associated with resource allocation mode indication for resource pool sharing, in accordance with the present disclosure.

FIG. 13 is a diagram illustrating an example process 1300 performed, for example, by a receiver UE, in accordance with the present disclosure. Example process 1300 is an example where the receiver UE (e.g., UE 120, UE 305, UE 405, UE 410, UE 510, receiver UE 601-2) performs operations associated with resource allocation mode indication for resource pool sharing.

As shown in FIG. 13, in some aspects, process 1300 may include receiving, from a transmitter UE, sidelink control information (SCI) that includes an indication of a sidelink resource allocation mode that indicates a manner in which one or more sidelink resources are allocated for use by the transmitter UE (block 1310). For example, the receiver UE (e.g., using communication manager 140 and/or reception component 1502, depicted in FIG. 15) may receive, from a transmitter UE, sidelink control information (SCI) that includes an indication of a sidelink resource allocation mode that indicates a manner in which one or more sidelink resources are allocated for use by the transmitter UE, as described above.

As further shown in FIG. 13, in some aspects, process 1300 may include communicating based at least in part on the indication (block 1320). For example, the receiver UE (e.g., using communication manager 140 and/or identification component 1508, depicted in FIG. 15) may communicate based at least in part on the indication, as described above.

Process 1300 may include additional aspects, such as any single aspect or any combination of aspects described below and/or in connection with one or more other processes described elsewhere herein.

In a first aspect, the indication indicates whether the sidelink resource allocation mode is a first sidelink resource allocation mode in which the one or more sidelink resources are allocated by a base station or a second sidelink resource allocation mode in which the one or more resource are allocated based at least in part on channel sensing.

In a second aspect, alone or in combination with the first aspect, the indication is a first indication if the one or more sidelink resources are scheduled by a first base station or a second indication if the one or more sidelink resources are scheduled by a second base station.

In a third aspect, alone or in combination with one or more of the first and second aspects, the one or more sidelink resources are selected from a resource pool, and wherein the resource pool supports one of a first sidelink resource allocation mode or a second sidelink resource allocation mode.

In a fourth aspect, alone or in combination with one or more of the first through third aspects, the resource pool is a first resource pool, and wherein the method further comprises transmitting, to the transmitter UE, a reservation for a set of sidelink resources of a second resource pool overlapped with the first resource pool, wherein the second resource pool supports a different sidelink resource allocation mode than the first resource pool.

In a fifth aspect, alone or in combination with one or more of the first through fourth aspects, the one or more sidelink resources are selected from a resource pool that supports multiple sidelink resource allocation modes.

In a sixth aspect, alone or in combination with one or more of the first through fifth aspects, process 1300 includes receiving information indicating the one or more sidelink resources as recommended resources, wherein the information indicating the one or more sidelink resources as recommended resources includes the indication.

In a seventh aspect, alone or in combination with one or more of the first through sixth aspects, process 1300 includes transmitting a communication on the one or more sidelink resources based at least in part on a priority associated with the one or more sidelink resources, wherein the communication is prioritized over another communication by the transmitter UE based at least in part on the indication received from the transmitter UE and an indication of the receiver UE, wherein the other communication is associated with the priority.

In an eighth aspect, alone or in combination with one or more of the first through seventh aspects, the priority is based at least in part on a portion of a resource pool in which the one or more sidelink resources are located, wherein different portions of the resource pool are associated with different priorities.

In a ninth aspect, alone or in combination with one or more of the first through eighth aspects, the priority is based at least in part on downlink control information.

In a tenth aspect, alone or in combination with one or more of the first through ninth aspects, at least one of the one or more sidelink resources is reserved for use by one of a first base station or a second base station.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
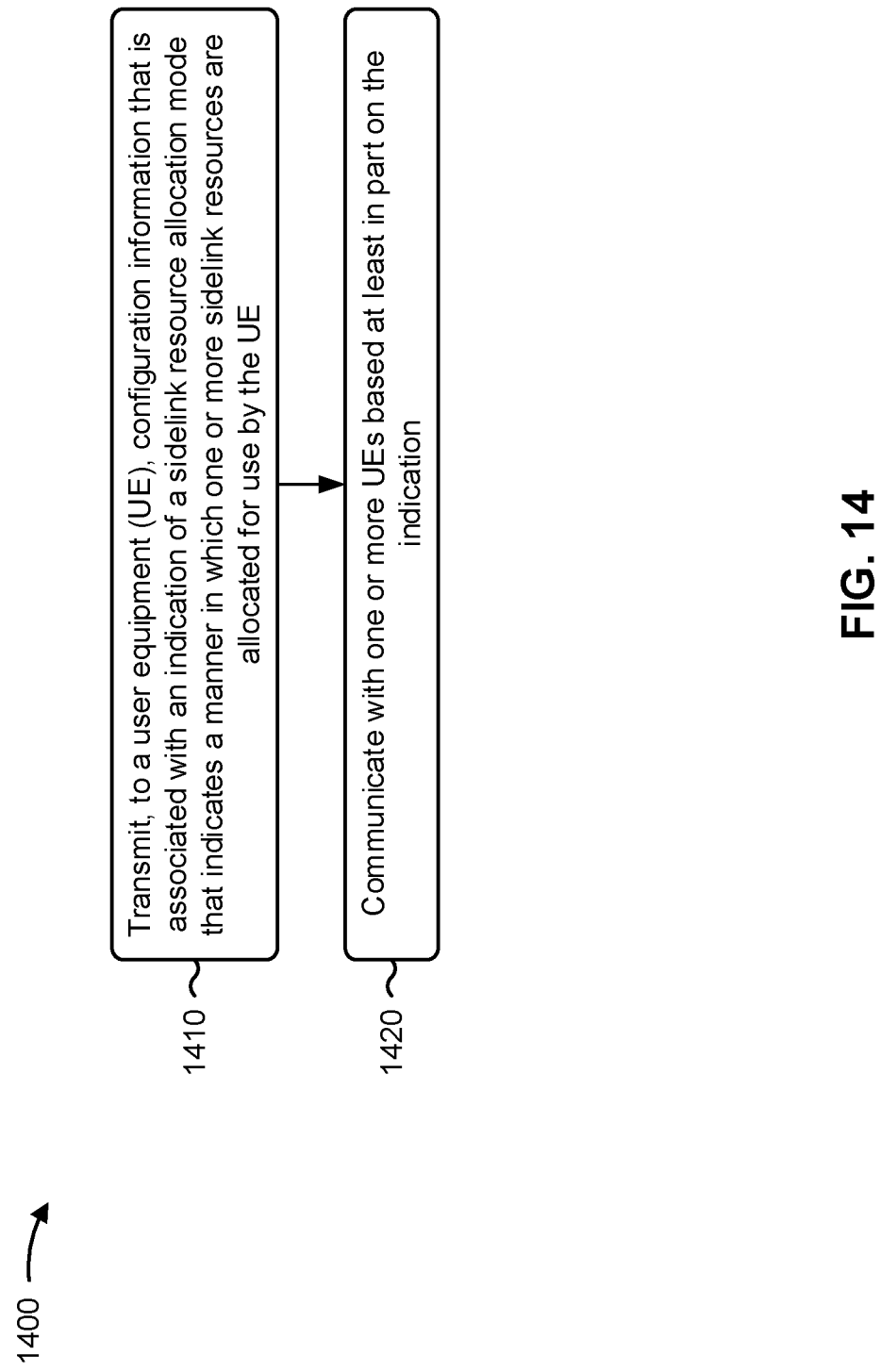
FIG. 14 is a diagram illustrating an example process associated with resource allocation mode indication for resource pool sharing, in accordance with the present disclosure.

FIG. 14 is a diagram illustrating an example process 1400 performed, for example, by a base station, in accordance with the present disclosure. Example process 1400 is an example where the base station (e.g., base station 110) performs operations associated with resource allocation mode indication for resource pool sharing.

As shown in FIG. 14, in some aspects, process 1400 may include transmitting, to a user equipment (UE), configuration information that is associated with an indication of a sidelink resource allocation mode that indicates a manner in which one or more sidelink resources are allocated for use by the UE (block 1410). For example, the base station (e.g., using communication manager 150 and/or configuration component 1608, depicted in FIG. 16) may transmit, to a user equipment (UE), configuration information that is associated with an indication of a sidelink resource allocation mode that indicates a manner in which one or more sidelink resources are allocated for use by the UE, as described above.

As further shown in FIG. 14, in some aspects, process 1400 may include communicating with one or more UEs based at least in part on the indication (block 1420). For example, the base station (e.g., using communication manager 150 and/or transmission component 1604, depicted in FIG. 16) may communicate with one or more UEs based at least in part on the indication, as described above.

Process 1400 may include additional aspects, such as any single aspect or any combination of aspects described below and/or in connection with one or more other processes described elsewhere herein.

In a first aspect, the indication indicates whether the sidelink resource allocation mode is a first sidelink resource allocation mode in which the one or more sidelink resources are allocated by a base station or a second sidelink resource allocation mode in which the one or more resource are allocated based at least in part on channel sensing.

In a second aspect, alone or in combination with the first aspect, the indication indicates whether the one or more sidelink resources were scheduled by the base station.

In a third aspect, alone or in combination with one or more of the first and second aspects, process 1400 includes transmitting a resource pool configuration that configures a resource pool from which one or more sidelink resources are selected, wherein the resource pool configuration indicates whether the resource pool supports a first sidelink resource allocation mode or a second sidelink resource allocation mode.

In a fourth aspect, alone or in combination with one or more of the first through third aspects, the one or more sidelink resources are selected from a resource pool that supports multiple sidelink resource allocation modes.

In a fifth aspect, alone or in combination with one or more of the first through fourth aspects, process 1400 includes receiving, from the UE, information associated with one or more sidelink resources allocated for use by at least one of the UE or another UE.

In a sixth aspect, alone or in combination with one or more of the first through fifth aspects, process 1400 includes transmitting a communication having a priority that is based at least in part on the indication.

In a seventh aspect, alone or in combination with one or more of the first through sixth aspects, the priority is based at least in part on a portion of a resource pool in which the one or more sidelink resources are located, wherein different portions of the resource pool are associated with different priorities.

In an eighth aspect, alone or in combination with one or more of the first through seventh aspects, the priority is based at least in part on downlink control information.

In a ninth aspect, alone or in combination with one or more of the first through eighth aspects, at least one of the one or more sidelink resources is reserved for use by only the base station and not another base station.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
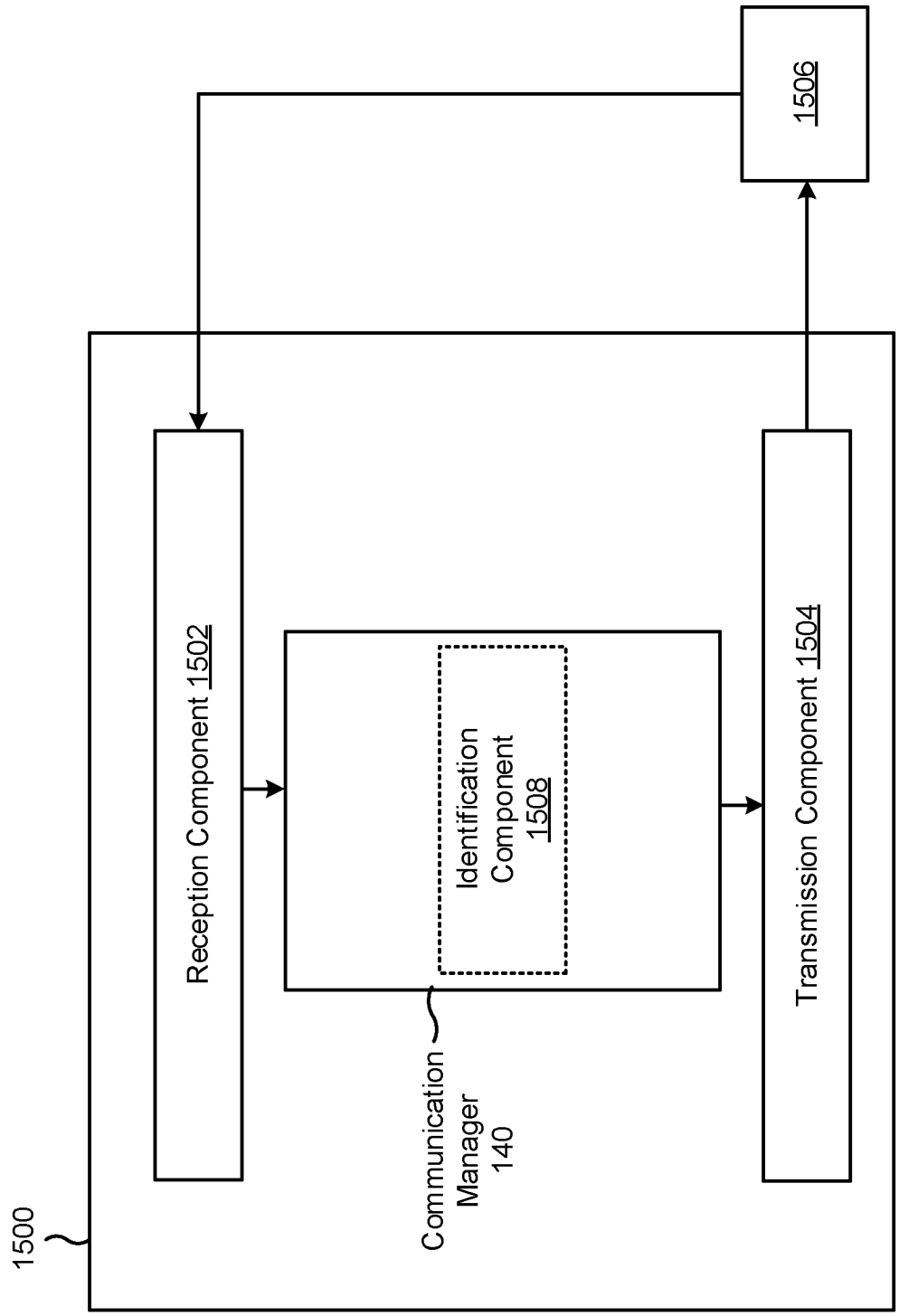
FIG. 15 is a diagram of an example apparatus for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include an identification component 1508, among other examples.

In some aspects, the apparatus 1500 may be configured to perform one or more operations described herein in connection with FIGS. 3-12. Additionally, or alternatively, the apparatus 1500 may be configured to perform one or more processes described herein, such as process 1200 of FIG. 12, process 1300 of FIG. 13, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The identification component 1508 may identify a sidelink resource allocation mode that indicates a manner in which one or more sidelink resources are allocated for use by the transmitter UE. The transmission component 1504 may transmit, to a receiver UE, sidelink control information (SCI) that includes an indication that is based at least on part on the sidelink resource allocation mode.

The reception component 1502 may receive a resource pool configuration that configures a resource pool from which one or more sidelink resources are selected, wherein the resource pool configuration indicates whether the resource pool supports a first sidelink resource allocation mode or a second sidelink resource allocation mode, and wherein the sidelink resource allocation mode is identified based at least in part on the resource pool configuration.

The reception component 1502 may receive information indicating one or more of the sidelink resources as recommended resources, wherein the sidelink resource allocation mode is identified based at least in part on the information.

The transmission component 1504 may transmit, to a base station, information associated with one or more sidelink resources allocated for use by the receiver UE.

The transmission component 1504 may transmit, to the receiver UE, a communication having a priority that is based at least in part on the indication.

The reception component 1502 may receive, from a transmitter UE, sidelink control information (SCI) that includes an indication of a sidelink resource allocation mode that indicates a manner in which one or more sidelink resources are allocated for use by the transmitter UE.

The reception component 1502 may receive information indicating the one or more sidelink resources as recommended resources, wherein the information indicating the one or more sidelink resources as recommended resources includes the indication.

The transmission component 1504 may transmit a communication on the one or more sidelink resources based at least in part on a priority associated with the one or more sidelink resources, wherein the communication is prioritized over another communication by the transmitter UE based at least in part on the indication received from the transmitter UE and an indication of the receiver UE, wherein the other communication is associated with the priority.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
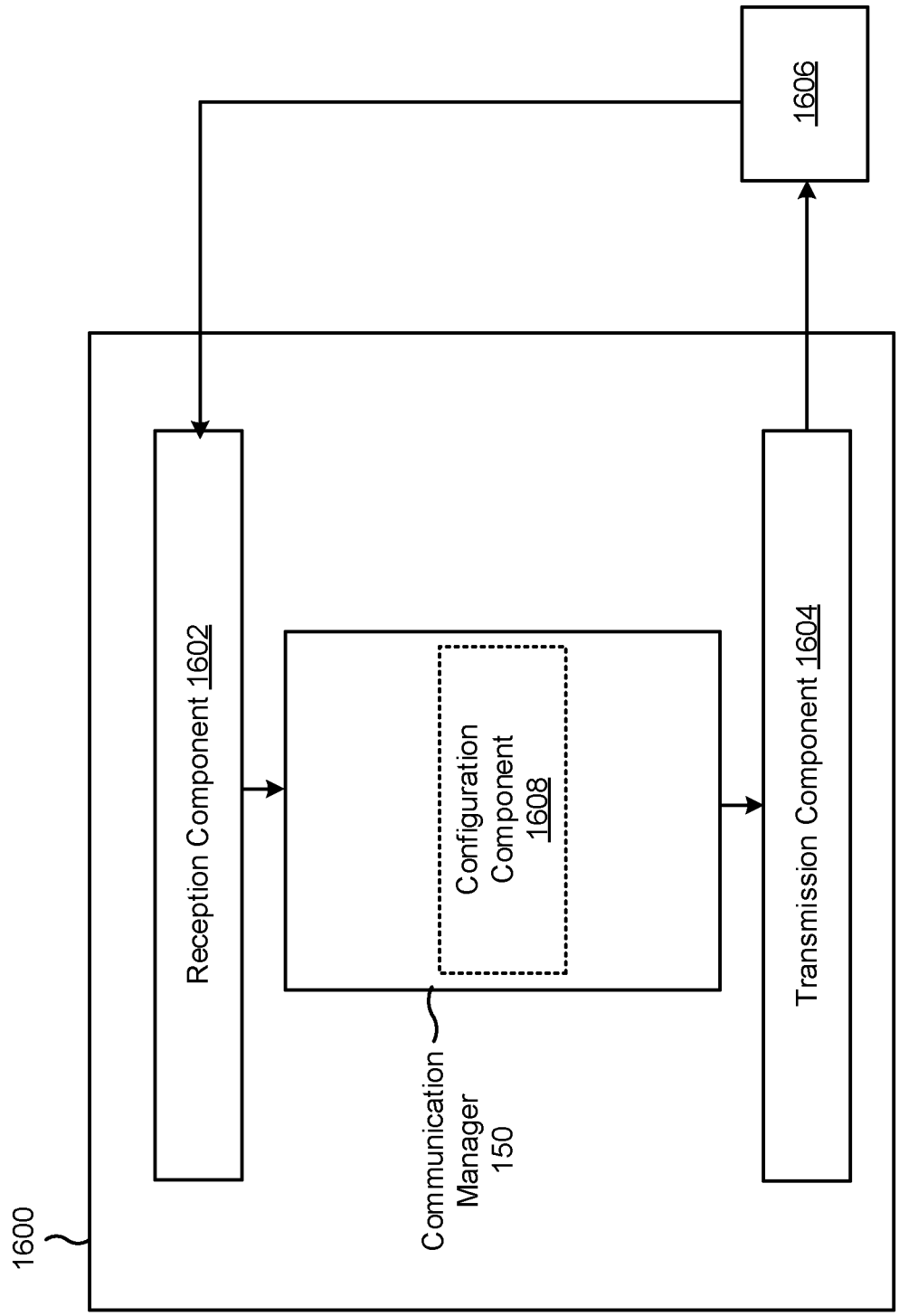
FIG. 16 is a diagram of an example apparatus for wireless communication, in accordance with the present disclosure.

FIG. 16 is a diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a configuration component 1608, among other examples.

In some aspects, the apparatus 1600 may be configured to perform one or more operations described herein in connection with FIGS. 3-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the base station described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the base station described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the base station described in connection with FIG. 2. In some aspects, the transmission component 1604 may be co-located with the reception component 1602 in a transceiver.

The transmission component 1604 may transmit, to a user equipment (UE), configuration information that is associated with an indication of a sidelink resource allocation mode that indicates a manner in which one or more sidelink resources are allocated for use by the UE.

The transmission component 1604 may transmit a resource pool configuration that configures a resource pool from which one or more sidelink resources are selected, wherein the resource pool configuration indicates whether the resource pool supports a first sidelink resource allocation mode or a second sidelink resource allocation mode.

The reception component 1602 may receive, from the UE, information associated with one or more sidelink resources allocated for use by at least one of the UE or another UE.

The transmission component 1604 may transmit a communication having a priority that is based at least in part on the indication.

Configuration component 1608 may transmit configuration information, such as the configuration information shown by reference number 602 in FIG. 6, information indicating one or more resource allocation modes, information indicating resource pool sharing, or the like.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a transmitter user equipment (UE), comprising: identifying a sidelink resource allocation mode that indicates a manner in which one or more sidelink resources are allocated for use by the transmitter UE; and transmitting, to a receiver UE, sidelink control information (SCI) that includes an indication that is based at least on part on the sidelink resource allocation mode.

Aspect 2: The method of Aspect 1, wherein the indication indicates whether the sidelink resource allocation mode is a first sidelink resource allocation mode in which the one or more sidelink resources are allocated by a base station or a second sidelink resource allocation mode in which the one or more resource are allocated based at least in part on channel sensing.

Aspect 3: The method of any of Aspects 1-2, wherein the indication is a first indication if the one or more sidelink resources are scheduled by a first base station or a second indication if the one or more sidelink resources are scheduled by a second base station.

Aspect 4: The method of any of Aspects 1-3, further comprising receiving a resource pool configuration that configures a resource pool from which one or more sidelink resources are selected, wherein the resource pool configuration indicates whether the resource pool supports a first sidelink resource allocation mode or a second sidelink resource allocation mode, and wherein the sidelink resource allocation mode is identified based at least in part on the resource pool configuration.

Aspect 5: The method of any of Aspects 1-4, wherein the one or more sidelink resources are selected from a resource pool that supports multiple sidelink resource allocation modes.

Aspect 6: The method of any of Aspects 1-5 further comprising receiving information indicating one or more of the sidelink resources as recommended resources, wherein the sidelink resource allocation mode is identified based at least in part on the information.

Aspect 7: The method of any of Aspects 1-6, further comprising transmitting, to a base station, information associated with one or more sidelink resources allocated for use by the receiver UE.

Aspect 8: The method of any of Aspects 1-7, further comprising transmitting, to the receiver UE, a communication having a priority that is based at least in part on the indication.

Aspect 9: The method of Aspect 8, wherein the priority is based at least in part on a portion of a resource pool in which the one or more sidelink resources are located, wherein different portions of the resource pool are associated with different priorities.

Aspect 10: The method of Aspect 8, wherein the priority is based at least in part on downlink control information.

Aspect 11: The method of any of Aspects 1-10, wherein at least one of the one or more sidelink resources is reserved for use by one of a first base station or a second base station.

Aspect 12: A method of wireless communication performed by a receiver user equipment (UE), comprising: receiving, from a transmitter UE, sidelink control information (SCI) that includes an indication of a sidelink resource allocation mode that indicates a manner in which one or more sidelink resources are allocated for use by the transmitter UE; and communicating based at least in part on the indication.

Aspect 13: The method of Aspect 12, wherein the indication indicates whether the sidelink resource allocation mode is a first sidelink resource allocation mode in which the one or more sidelink resources are allocated by a base station or a second sidelink resource allocation mode in which the one or more resource are allocated based at least in part on channel sensing.

Aspect 14: The method of any of Aspects 12-13, wherein the indication is a first indication if the one or more sidelink resources are scheduled by a first base station or a second indication if the one or more sidelink resources are scheduled by a second base station.

Aspect 15: The method of any of Aspects 12-14, wherein the one or more sidelink resources are selected from a resource pool, and wherein the resource pool supports one of a first sidelink resource allocation mode or a second sidelink resource allocation mode.

Aspect 16: The method of Aspect 15, wherein the resource pool is a first resource pool, and wherein the method further comprises transmitting, to the transmitter UE, a reservation for a set of sidelink resources of a second resource pool overlapped with the first resource pool, wherein the second resource pool supports a different sidelink resource allocation mode than the first resource pool.

Aspect 17: The method of any of Aspects 12-16, wherein the one or more sidelink resources are selected from a resource pool that supports multiple sidelink resource allocation modes.

Aspect 18: The method of any of Aspects 12-17, further comprising receiving information indicating the one or more sidelink resources as recommended resources, wherein the information indicating the one or more sidelink resources as recommended resources includes the indication.

Aspect 19: The method of any of Aspects 12-18, further comprising: transmitting a communication on the one or more sidelink resources based at least in part on a priority associated with the one or more sidelink resources, wherein the communication is prioritized over another communication by the transmitter UE based at least in part on the indication received from the transmitter UE and an indication of the receiver UE, wherein the other communication is associated with the priority.

Aspect 20: The method of Aspect 19, wherein the priority is based at least in part on a portion of a resource pool in which the one or more sidelink resources are located, wherein different portions of the resource pool are associated with different priorities.

Aspect 21: The method of Aspect 19, wherein the priority is based at least in part on downlink control information.

Aspect 22: The method of any of Aspects 12-21, wherein at least one of the one or more sidelink resources is reserved for use by one of a first base station or a second base station.

Aspect 23: A method of wireless communication performed by a base station, comprising: transmitting, to a user equipment (UE), configuration information that is associated with an indication of a sidelink resource allocation mode that indicates a manner in which one or more sidelink resources are allocated for use by the UE; and communicating with one or more UEs based at least in part on the indication.

Aspect 24: The method of Aspect 23, wherein the indication indicates whether the sidelink resource allocation mode is a first sidelink resource allocation mode in which the one or more sidelink resources are allocated by a base station or a second sidelink resource allocation mode in which the one or more resource are allocated based at least in part on channel sensing.

Aspect 25: The method of any of Aspects 23-24, wherein the indication indicates whether the one or more sidelink resources were scheduled by the base station.

Aspect 26: The method of any of Aspects 23-25, further comprising transmitting a resource pool configuration that configures a resource pool from which one or more sidelink resources are selected, wherein the resource pool configuration indicates whether the resource pool supports a first sidelink resource allocation mode or a second sidelink resource allocation mode.

Aspect 27: The method of any of Aspects 23-26, wherein the one or more sidelink resources are selected from a resource pool that supports multiple sidelink resource allocation modes.

Aspect 28: The method of any of Aspects 23-27, further comprising receiving, from the UE, information associated with one or more sidelink resources allocated for use by at least one of the UE or another UE.

Aspect 29: The method of any of Aspects 23-28, further comprising transmitting a communication having a priority that is based at least in part on the indication.

Aspect 30: The method of Aspect 29, wherein the priority is based at least in part on a portion of a resource pool in which the one or more sidelink resources are located, wherein different portions of the resource pool are associated with different priorities.

Aspect 31: The method of Aspect 29, wherein the priority is based at least in part on downlink control information.

Aspect 32: The method of any of Aspects 23-31, wherein at least one of the one or more sidelink resources is reserved for use by only the base station and not another base station.

Aspect 33: An apparatus for wireless communication at a device, comprising a processor; memory coupled with the processor; and instructions stored in the memory and executable by the processor to cause the apparatus to perform the method of one or more of Aspects 1-11.

Aspect 34: A device for wireless communication, comprising a memory and one or more processors coupled to the memory, the one or more processors configured to perform the method of one or more of Aspects 1-11.

Aspect 35: An apparatus for wireless communication, comprising at least one means for performing the method of one or more of Aspects 1-11.

Aspect 36: A non-transitory computer-readable medium storing code for wireless communication, the code comprising instructions executable by a processor to perform the method of one or more of Aspects 1-11.

Aspect 37: A non-transitory computer-readable medium storing a set of instructions for wireless communication, the set of instructions comprising one or more instructions that, when executed by one or more processors of a device, cause the device to perform the method of one or more of Aspects 1-11.

Aspect 38: An apparatus for wireless communication at a device, comprising a processor; memory coupled with the processor; and instructions stored in the memory and executable by the processor to cause the apparatus to perform the method of one or more of Aspects 12-22.

Aspect 39: A device for wireless communication, comprising a memory and one or more processors coupled to the memory, the one or more processors configured to perform the method of one or more of Aspects 12-22.

Aspect 40: An apparatus for wireless communication, comprising at least one means for performing the method of one or more of Aspects 12-22.

Aspect 41: A non-transitory computer-readable medium storing code for wireless communication, the code comprising instructions executable by a processor to perform the method of one or more of Aspects 12-22.

Aspect 42: A non-transitory computer-readable medium storing a set of instructions for wireless communication, the set of instructions comprising one or more instructions that, when executed by one or more processors of a device, cause the device to perform the method of one or more of Aspects 12-22.

Aspect 43: An apparatus for wireless communication at a device, comprising a processor; memory coupled with the processor; and instructions stored in the memory and executable by the processor to cause the apparatus to perform the method of one or more of Aspects 23-32.

Aspect 44: A device for wireless communication, comprising a memory and one or more processors coupled to the memory, the one or more processors configured to perform the method of one or more of Aspects 23-32.

Aspect 45: An apparatus for wireless communication, comprising at least one means for performing the method of one or more of Aspects 23-32.

Aspect 46: A non-transitory computer-readable medium storing code for wireless communication, the code comprising instructions executable by a processor to perform the method of one or more of Aspects 23-32.

Aspect 47: A non-transitory computer-readable medium storing a set of instructions for wireless communication, the set of instructions comprising one or more instructions that, when executed by one or more processors of a device, cause the device to perform the method of one or more of Aspects 23-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
   one or more memories; and
   one or more processors, coupled to the one or more memories, configured to:
   identify a first sidelink resource allocation mode that indicates a manner in which one or more sidelink resources are allocated for the first UE;
   transmit, to a second UE, sidelink control information (SCI) that includes an indication that is based at least on part on the first sidelink resource allocation mode; and
   transmit, to a network entity, information associated with one or more resources allocated for the second UE in accordance with a second sidelink resource allocation mode, wherein the information comprises loading information reported to the network entity in accordance with a reference signal received power corresponding to the SCI.

2. The apparatus of claim 1, wherein the indication indicates whether the first sidelink resource allocation mode is:
   a sidelink resource allocation mode in which the one or more sidelink resources are allocated by the network entity, or
   a sidelink resource allocation mode in which the one or more sidelink resources are allocated based at least in part on channel sensing.

3. The apparatus of claim 1, wherein, for the first sidelink resource allocation mode, the indication is:
   a first indication if the one or more sidelink resources are scheduled by a first network entity, or
   a second indication if the one or more sidelink resources are scheduled by a second network entity.

4. The apparatus of claim 1, wherein the one or more processors are further configured to receive a resource pool configuration that configures a resource pool from which one or more sidelink resources are selected,
   wherein the resource pool configuration indicates whether the resource pool supports the first sidelink resource allocation mode or the second sidelink resource allocation mode, and
   wherein the first sidelink resource allocation mode is identified based at least in part on the resource pool configuration.

5. The apparatus of claim 1, wherein the one or more sidelink resources are selected from a resource pool that supports multiple sidelink resource allocation modes.

6. The apparatus of claim 5, wherein the multiple sidelink resource allocation modes include the first sidelink resource allocation mode and the second resource allocation mode, and
   wherein the first UE is configured to operate according to the first sidelink resource allocation mode, and wherein the second UE is configured to operate according to the second resource allocation mode.

7. The apparatus of claim 1, wherein the one or more processors are further configured to receive information indicating one or more of the sidelink resources as recommended resources, wherein the first sidelink resource allocation mode is identified based at least in part on the info Illation indicating the recommended resources.

8. The apparatus of claim 1, wherein the one or more processors are further configured to transmit, to the second UE, a communication having a priority that is based at least in part on the indication.

9. The apparatus of claim 8, wherein the priority is based at least in part on a portion of a resource pool in which the one or more sidelink resources are located, wherein different portions of the resource pool are associated with different priorities.

10. The apparatus of claim 8, wherein the priority is based at least in part on downlink control information.

11. The apparatus of claim 1, wherein at least one of the one or more sidelink resources is reserved for use by one of a first network entity or a second network entity.

12. An apparatus for wireless communication at a first user equipment (UE), comprising:
one or more memories; and
one or more processors, coupled to the one or more memories, configured to:
receive, from a second UE, sidelink control information (SCI) that includes a first indication of a sidelink resource allocation mode that indicates a manner in which one or more sidelink resources are allocated for the second UE using a resource pool associated with a plurality of sidelink resource allocation modes;
communicate based at least in part on the first indication; and
transmit a communication on the one or more sidelink resources based at least in part on a priority associated with the one or more sidelink resources, wherein the communication is prioritized over another communication by the second UE based at least in part on the first indication received from the second UE and a second indication of the first UE, wherein the other communication is associated with the priority.

13. The apparatus of claim 12,
wherein the plurality of sidelink resource allocation modes includes at least one of:
a sidelink resource allocation mode in which the one or more sidelink resources are allocated by a network entity, or
a sidelink resource allocation mode in which the one or more sidelink resource are allocated based at least in part on channel sensing,
wherein the indication indicates whether the sidelink resource allocation mode is:
the sidelink resource allocation mode in which the one or more sidelink resources are allocated by the network entity, or
the sidelink resource allocation mode in which the one or more sidelink resources are allocated based at least in part on the channel sensing.

14. The apparatus of claim 12, wherein the one or more sidelink resources are selected from the resource pool.

15. The apparatus of claim 12, wherein the one or more processors are further configured to receive, from the second UE, information identifying a set of recommended resources for the communication.

16. An apparatus for wireless communication at a network entity, comprising:
one or more memories; and
one or more processors, coupled to the one or more memories, configured to:
transmit, to a user equipment (UE), configuration information that is associated with an indication of a first sidelink resource allocation mode that indicates a manner in which one or more sidelink resources are allocated for the UE;
communicate with one or more UEs based at least in part on the indication; and
receive, from the UE, information associated with one or more sidelink resources allocated in accordance with a second sidelink resource allocation mode, wherein the info Illation comprises loading info Illation reported to the network entity in accordance with a reference signal received power corresponding to sidelink control information associated with the UE.

17. The apparatus of claim 16, wherein the indication indicates whether the first sidelink resource allocation mode is:
a sidelink resource allocation mode in which the one or more sidelink resources are allocated by a network entity, or
a sidelink resource allocation mode in which the one or more sidelink resources are allocated based at least in part on channel sensing.

18. The apparatus of claim 16, wherein the one or more sidelink resources are allocated for use by at least one of the UE or another UE using the second sidelink resource allocation mode.

19. The apparatus of claim 16, wherein the one or more processors are further configured to transmit a communication having a priority that is based at least in part on the indication.

20. A method of wireless communication performed by a first user equipment (UE), comprising:
identifying a first sidelink resource allocation mode that indicates a manner in which one or more sidelink resources are allocated for the first UE;
transmitting, to a second UE, sidelink control information (SCI) that includes an indication that is based at least on part on the first sidelink resource allocation mode; and
transmitting, to a network entity, information associated with one or more resources allocated for the second UE in accordance with a second sidelink resource allocation mode, wherein the information comprises loading information reported to the network entity in accordance with a reference signal received power corresponding to the SCI.

21. The method of claim 20, wherein the indication indicates whether the first sidelink resource allocation mode is:
a sidelink resource allocation mode in which the one or more sidelink resources are allocated by the network entity, or
a sidelink resource allocation mode in which the one or more sidelink resources are allocated based at least in part on channel sensing.

22. The method of claim 20, wherein, for the first sidelink resource allocation mode, the indication is:
a first indication if the one or more sidelink resources are scheduled by a first network entity, or
a second indication if the one or more sidelink resources are scheduled by a second network entity.

23. The method of claim 20, further comprising receiving a resource pool configuration that configures a resource pool from which one or more sidelink resources are selected,
wherein the resource pool configuration indicates whether the resource pool supports the first sidelink resource allocation mode or the second sidelink resource allocation mode, and
wherein the first sidelink resource allocation mode is identified based at least in part on the resource pool configuration.

24. The method of claim 20, wherein the one or more sidelink resources are selected from a resource pool that supports multiple sidelink resource allocation modes.

25. The method of claim 24, wherein the multiple sidelink resource allocation modes include the first sidelink resource allocation mode and the second resource allocation mode.

26. The method of claim 20, further comprising receiving information indicating one or more of the sidelink resources as recommended resources, wherein the first sidelink resource allocation mode is identified based at least in part on the information indicating the recommended resources.

27. The method of claim 20, further comprising transmitting, to the second UE, a communication having a priority that is based at least in part on the indication.

28. The method of claim 27, wherein the priority is based at least in part on a portion of a resource pool in which the one or more sidelink resources are located, wherein different portions of the resource pool are associated with different priorities.

29. The method of claim 27, wherein the priority is based at least in part on downlink control information.

30. The method of claim 20, wherein at least one of the one or more sidelink resources is reserved for use by one of a first network entity or a second network entity.

\* \* \* \* \*